(12) United States Patent
Kelsey et al.

(10) Patent No.: US 11,834,357 B2
(45) Date of Patent: Dec. 5, 2023

(54) WATER TREATMENT SYSTEM

(71) Applicants: Michael Kelsey, Waltham Abbey (GB); Stephen Mann, New York, NY (US); Robert Kelsey, Chesham (GB); Stephen McKenzie, Portsmouth, NH (US)

(72) Inventors: Michael Kelsey, Waltham Abbey (GB); Stephen Mann, New York, NY (US); Robert Kelsey, Chesham (GB); Stephen McKenzie, Portsmouth, NH (US)

( * ) Notice: Subject to any disclaimer, the term of this patent is extended or adjusted under 35 U.S.C. 154(b) by 104 days.

(21) Appl. No.: 17/229,321

(22) Filed: Apr. 13, 2021

(65) Prior Publication Data

US 2021/0323850 A1 Oct. 21, 2021

Related U.S. Application Data

(60) Provisional application No. 63/010,188, filed on Apr. 15, 2020.

(51) Int. Cl.
*C02F 9/00* (2023.01)
*C02F 103/00* (2006.01)
(Continued)

(52) U.S. Cl.
CPC ............... *C02F 9/00* (2013.01); *C02F 1/004* (2013.01); *C02F 1/34* (2013.01); *C02F 1/441* (2013.01);
(Continued)

(58) Field of Classification Search
CPC .... C02F 9/00; C02F 1/004; C02F 1/34; C02F 1/441; C02F 1/78; C02F 3/28;
(Continued)

(56) References Cited

U.S. PATENT DOCUMENTS 3,995,328 A * 12/1976 Carolan ................. B64D 11/02
 210/167.01
8,486,275 B2 * 7/2013 Wolf ......................... C02F 9/00
 210/741
(Continued)

FOREIGN PATENT DOCUMENTS

CN 103663868 A * 3/2014 ................ C02F 9/14

OTHER PUBLICATIONS

Translation of CN103663868 (Year: 2014).*

*Primary Examiner* — Ekandra S. Miller-Cruz
(74) *Attorney, Agent, or Firm* — Lambert Shortell & Connaughton; David J. Connaughton, Jr.; Justin P. Tinger

(57) ABSTRACT

Examples disclosed herein relate to a water treatment system including a first cavitation device coupled to a wastewater source via one or more cavitation device lines, a filter coupled to the first cavitation device via one or more filter lines, an equalizing tank coupled to the filter via one or more equalizing tank lines, a second cavitation device coupled to the equalizing tank via one or more second cavitation device lines where a flow from the equalizing tank which enters the second cavitation device is modified and reenters the equalizing tank, a first booster pump coupled to the equalizing tank via one or more first boost pump lines, a contact tank coupled to the first booster pump via one or more contact tank lines, a carbon filtration device coupled to the contact tank, a biological treatment system coupled to the carbon filtration device via one or more biological treatment system lines, a second booster pump coupled to the biological treatment system via one or more second booster pump lines, a polishing mass media filter coupled to the second booster pump via one or more polishing mass media filter lines, a granular activated carbon system coupled to the polishing mass media filter via one or more granular activated carbon system feeds, an ozonation system coupled to (Continued)

the granular activated carbon system via one or more ozonation system lines, a reaction tank coupled to the ozonation system via one or more reaction tank lines, a third booster pump coupled to the reaction tank via one or more third booster pump lines, a reverse osmosis pump coupled to the third booster pump via one or more reverse osmosis pump lines, a reverse osmosis system coupled to the reverse osmosis pump via one or more reverse osmosis system lines, and a SOW tank coupled to the reverse osmosis system via one or more SOW lines.

19 Claims, 10 Drawing Sheets

(51) Int. Cl.
    *C02F 1/34* (2023.01)
    *C02F 1/00* (2023.01)
    *C02F 1/78* (2023.01)
    *C02F 103/20* (2006.01)
    *C02F 3/28* (2023.01)
    *C02F 1/44* (2023.01)

(52) U.S. Cl.
    CPC ............... *C02F 1/78* (2013.01); *C02F 3/28* (2013.01); *C02F 2001/007* (2013.01); *C02F 2103/005* (2013.01); *C02F 2103/20* (2013.01); *C02F 2301/043* (2013.01); *C02F 2301/046* (2013.01); *C02F 2301/08* (2013.01); *C02F 2303/16* (2013.01); *C02F 2303/22* (2013.01)

(58) Field of Classification Search
    CPC .......... C02F 2001/007; C02F 2103/005; C02F 2103/20; C02F 2301/043; C02F 2301/046; C02F 2301/08; C02F 2303/16; C02F 2303/22; C02F 1/283; C02F 1/52; C02F 3/102; C02F 2209/006; C02F 2209/02; C02F 2209/03; C02F 2209/06; C02F 2209/40; Y02W 10/10; Y02W 10/37
    USPC ....................................................... 210/195.2
    See application file for complete search history.

(56) References Cited

U.S. PATENT DOCUMENTS

2015/0158744 A1* 6/2015 Taniguchi ............ B01D 61/026
    210/252
2018/0320356 A1* 11/2018 Wang .................... C02F 3/2826

* cited by examiner

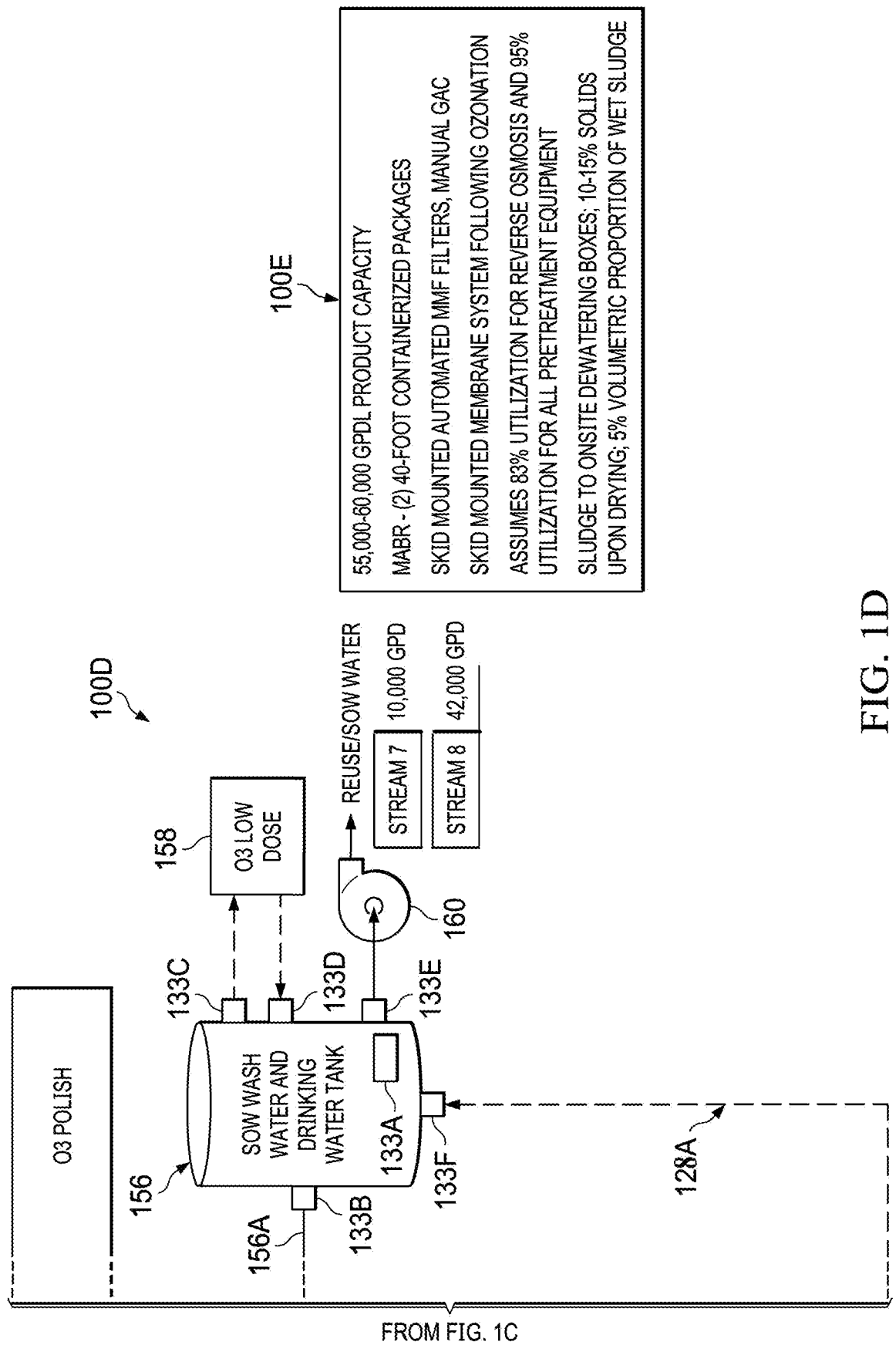

| MASS BALANCE/ FLOW - PROCESS STREAMS | 0.73 | 0.83 RO UTILIZATION | | NOTES |
|---|---|---|---|---|
| | | 0.95 PRETREAT UTILIZATION | | |
| NUMBER OF MEMBRANE TRAINS | 1 | GALLONS PER DAY (GPD) | | |
| STREAM 0 - FEED WATER FLOW | 90 GPM | | 97,200 | TO T-01 AT NEEDED UTILIZATION |
| STREAM 1 - PRETREATMENT WATER FLOW | 60.0 GPM | | 82,080 | TO T-03 AT 95% UTILIZATION |
| STREAM 2A - TOILET FLUSH FROM EQUALIZATION | MAKEUP | | 14,500 | MAKEUP TO BLEND WITH DECANT |
| STREAM 2B - TOILET FLUSH WATER | DECANT WATER | | 9,500 | T-02 DECANT WATER |
| STREAM 3 - BACKWASH SUPPLY/WASTEWATER | | | 10,500 | CALCULATED FOR MMF#1, #2 |
| STREAM 1 - STREAM 3 | AVAILABLE FEED TO RO | | 71,580 | AVAILABLE FEED TO RO FROM T-03 |
| STREAM 4 - FEED FLOW TO RO | 60.0 GPM | | 71,712 | AT GIVEN UTILIZATION |
| STREAM 5 - CONCENTRATE FLOW | 16.2 GPM | | 19,362 | TO T-04 IRRIGATION |
| STREAM 6 - PERMEATE FLOW | 43.8 GPM | | 52,350 | PRODUCT TO T-05 |
| STREAM 7 - SOW WASH WATER | | | 10,000 | GIVEN USE FROM T-05 |
| STREAM 8 - DRINKING WATER | | | 42,000 | GIVEN USE FROM T-05 |
| STREAM 9 - SLUDGE TO ONSITE DISPOSAL | INTERMITTENT | | 630 GALS WET / 19 cuft | Cuft OF D-SLUDGE PER DAY (D-BOX) |
| STREAM 10 - FEED TO MABR | 60.0 GPM | | 82,080 | GPD AVE |
| STREAM 11 - POST MABR | 60.0 GPM | | 82,080 | GPD AVE |
| STREAM 12 - IRRIGATION WATER | 16.2 GPM + BW WATER | | 22,362 | GPD FROM RO REJECT AND MMF BW |

WATER TREATMENT SYSTEM

REFERENCE

The present application claims priority to U.S. provisional patent application Ser. No. 63/010,188, entitled "Water Treatment System", filed on Apr. 15, 2020, which is incorporated in its entirety herein by reference.

FIELD

The subject matter disclosed herein relates to a water treatment system. More specifically, to an innovative water treatment system to remove waste.

INFORMATION

The water treatment industry has numerous ways to treat water to remove waste. This disclosure highlights enhanced devices, methods, and systems for water treatment to remove waste.

BRIEF DESCRIPTION OF THE FIGURES

Non-limiting and non-exhaustive examples will be described with reference to the following figures, wherein like reference numerals refer to like parts throughout the various figures.

FIG. 1D is another illustration of a waste water system functionality, according to one embodiment.

FIG. 1E is another illustration of a waste water system functionality, according to one embodiment.

DETAILED DESCRIPTION OF THE DISCLOSURE

Figure 1A:
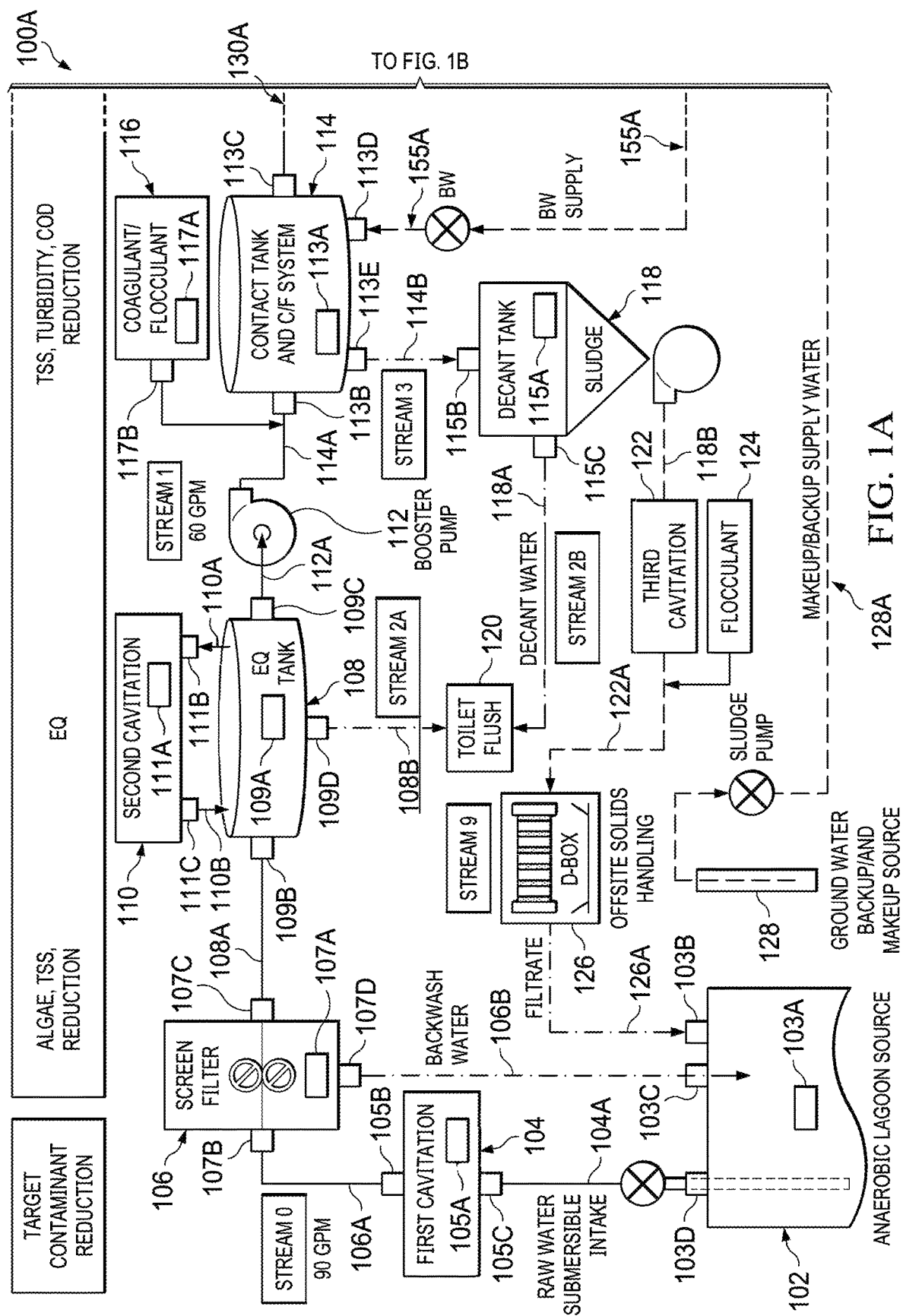
FIG. 1A is an illustration of a waste water system functionality, according to one embodiment.

In FIG. 1A, a first portion 100A of the waste water system (reference numbers 100A, 100B, 100C, and 100D) is shown, according to one embodiment. The first portion 100A of the waste water system may include an anaerobic lagoon source 102, a first cavitation device 104, a screen filter 106, an equalizing tank 108, a second cavitation device 110, a first booster pump 112, a contact tank and carbon filter system 114, a coagulant/flocculant device 116, a decanting tank 118, one or more toilet devices 120, a third cavitation device 122 (and/or Nth cavitation device), a flocculant device 124, a D-Box 126, and/or a ground water backup/and makeup source 128. In one example, the first cavitation device 104 is connected to the anaerobic lagoon source 102 via one or more first cavitation device lines 104A. Further, the first cavitation device 104 is connected to the screen filter 106 via one or more screen filter lines 106A. In addition, the screen filter 106 is connected to the equalizing tank 108 via one or more equalizing tank lines 108A. Further, the equalizing tank 108 is connected to the first booster pump 112 via one or more first booster pump lines 112A. In addition, the first booster pump 112 is connected to the contact tank and carbon filtration system 114 via one or more contact tank lines 114A. Further, the coagulant/flocculant device 116 is connected to contact tank and carbon filtration system 114 via the one or more contact tank lines 114A. In addition, the contact tank and carbon filtration system 114 is connected to the decant tank 118 via a second set of contact tank lines 114B. In addition, the decant tank 118 is connected to the one or more toilet devices 120 via one or more decant tank lines 118A. Further, the decant tank 118 is connected to the third cavitation device 122 via a second set of decent tank lines 118B. The third cavitation device 122 is connected to the D-Box 126 via one or more third cavitation device lines 122A. In addition, the flocculant device 124 is connected to the D-Box via the one or more third cavitation device lines 122A. The D-Box 126 is connected to the anaerobic lagoon source 102 via one or more D-Box lines 126A. In addition, any of the devices disclosed in this document may be connected to the ground water backup/and makeup source 128 via makeup/backup supply or alternate source ground water lines 128A.

In one example, a backwash water may travel from the screen filter 106 to the anaerobic lagoon source 102 via a second set of screen filter lines 106B. Further, a fluid stream may travel from the equalizing tank 108 to the one or more toilet devices 120 via a second set of equalizing tank lines 108B.

In various examples, each device, system, and/or unit in FIGS. 1A-1D has one or more sensors that measure temperature, energy usage (e.g., kWh), water characteristics (any water characteristic disclosed in this document), energy demand (e.g., kW), flow rate, pressure, viscosity, efficiency, effectiveness, and/or any data point discussed in this disclosure. Further, every input or output line from each device, system, and/or unit in FIGS. 1A-1D has one or more sensors that measure temperature, water characteristics (any water characteristic disclosed in this document), flow rate, pressure, viscosity, efficiency, effectiveness, and/or any data point discussed in this disclosure. In one example, the water treatment system 100 may have a first anaerobic lagoon source sensor 103A which measures the temperature, flow rate, and water characteristics (any water characteristic disclosed in this document) of the lagoon. In addition, the water treatment system 100 may have a second anaerobic lagoon source sensor 103B, a third anaerobic lagoon source sensor 103C, and an Nth anaerobic lagoon source sensor 103D which measures the temperature, flow rate, and water characteristics (any water characteristic disclosed in this document) of the respective fluid flows. In another example, the water treatment system 100 may have a first first cavitation sensor 105A which measures the temperature, energy usage (e.g., kWh), water characteristics (any water characteristic disclosed in this document), energy demand (e.g., kW), flow rate, pressure, viscosity, efficiency, effectiveness, and/or any other data point discussed in this disclosure of the first cavitation device 104. In addition, the water treatment system 100 may have a second first cavitation device sensor 105B and/or a third first cavitation device sensor 105C which measures the temperature, flow rate, and water characteristics (any water characteristic disclosed in this document) of the respective fluid flows. In another example, the water treatment system 100 may have a first screen filter sensor 107A which measures the temperature, energy usage (e.g., kWh), water characteristics (any water characteristic disclosed in this document), energy demand (e.g., kW), flow rate, pressure, viscosity, efficiency, effectiveness, and/or any other data point discussed in this disclosure of the screen filter 106. In addition, the water treatment system 100 may have a second screen filter sensor 107B and/or a third screen filter sensor 107C which measures the temperature, flow rate, and water characteristics (any water characteristic disclosed in this document) of the respective fluid flows. In another example, the water treatment system 100 may have a first equalizing tank sensor 109A which measures the temperature, energy usage (e.g., kWh), water characteristics (any water characteristic disclosed in this document), energy demand (e.g., kW), flow rate, pressure, viscosity, efficiency, effectiveness, and/or any other data point discussed in this disclosure of the equalizing tank 108. In addition, the water treatment system 100 may have a second equalizing tank sensor 109B, a third equalizing tank sensor 109C, and/or an Nth equalizing tank sensor 109D which measures the temperature, flow rate, and water characteristics (any water characteristic disclosed in this document) of the respective fluid flows. In another example, the water treatment system 100 may have a first second cavitation sensor 111A which measures the temperature, energy usage (e.g., kWh), water characteristics (any water characteristic disclosed in this document), energy demand (e.g., kW), flow rate, pressure, viscosity, efficiency, effectiveness, and/or any other data point discussed in this disclosure of the second cavitation device 110. In addition, the water treatment system 100 may have a second second cavitation device sensor 111B and/or a third second cavitation device sensor 111C which measures the temperature, flow rate, and water characteristics (any water characteristic disclosed in this document) of the respective fluid flows. In another example, the water treatment system 100 may have a first contact tank sensor 113A which measures the temperature, energy usage (e.g., kWh), water characteristics (any water characteristic disclosed in this document), energy demand (e.g., kW), flow rate, pressure, viscosity, efficiency, effectiveness, and/or any other data point discussed in this disclosure of the contact tank 114. In addition, the water treatment system 100 may have a second contact sensor 113B, a third contact tank sensor 113C, a fourth contact tank sensor 113D, and/or an Nth contact tank sensor 113E which measures the temperature, flow rate, and water characteristics (any water characteristic disclosed in this document) of the respective fluid flows. In another example, the water treatment system 100 may have a first decant tank sensor 115A which measures the temperature, energy usage (e.g., kWh), water characteristics (any water characteristic disclosed in this document), energy demand (e.g., kW), flow rate, pressure, viscosity, efficiency, effectiveness, and/or any other data point discussed in this disclosure of the decant tank 118. In addition, the water treatment system 100 may have a second decant tank sensor 115B and/or a third decant tank sensor 115C which measures the temperature, flow rate, and water characteristics (any water characteristic disclosed in this document) of the respective fluid flows.

In another example, the water treatment system 100 may have a first coagulant/flocculant sensor 117A which measures the temperature, energy usage (e.g., kWh), water characteristics (any water characteristic disclosed in this document), energy demand (e.g., kW), flow rate, pressure, viscosity, efficiency, effectiveness, and/or any other data point discussed in this disclosure of the coagulant/flocculant device 116. In addition, the water treatment system 100 may have a second coagulant/flocculant device sensor 117B which measures the temperature, flow rate, and water characteristics (any water characteristic disclosed in this document) of the respective fluid flow.

Figure 1B:
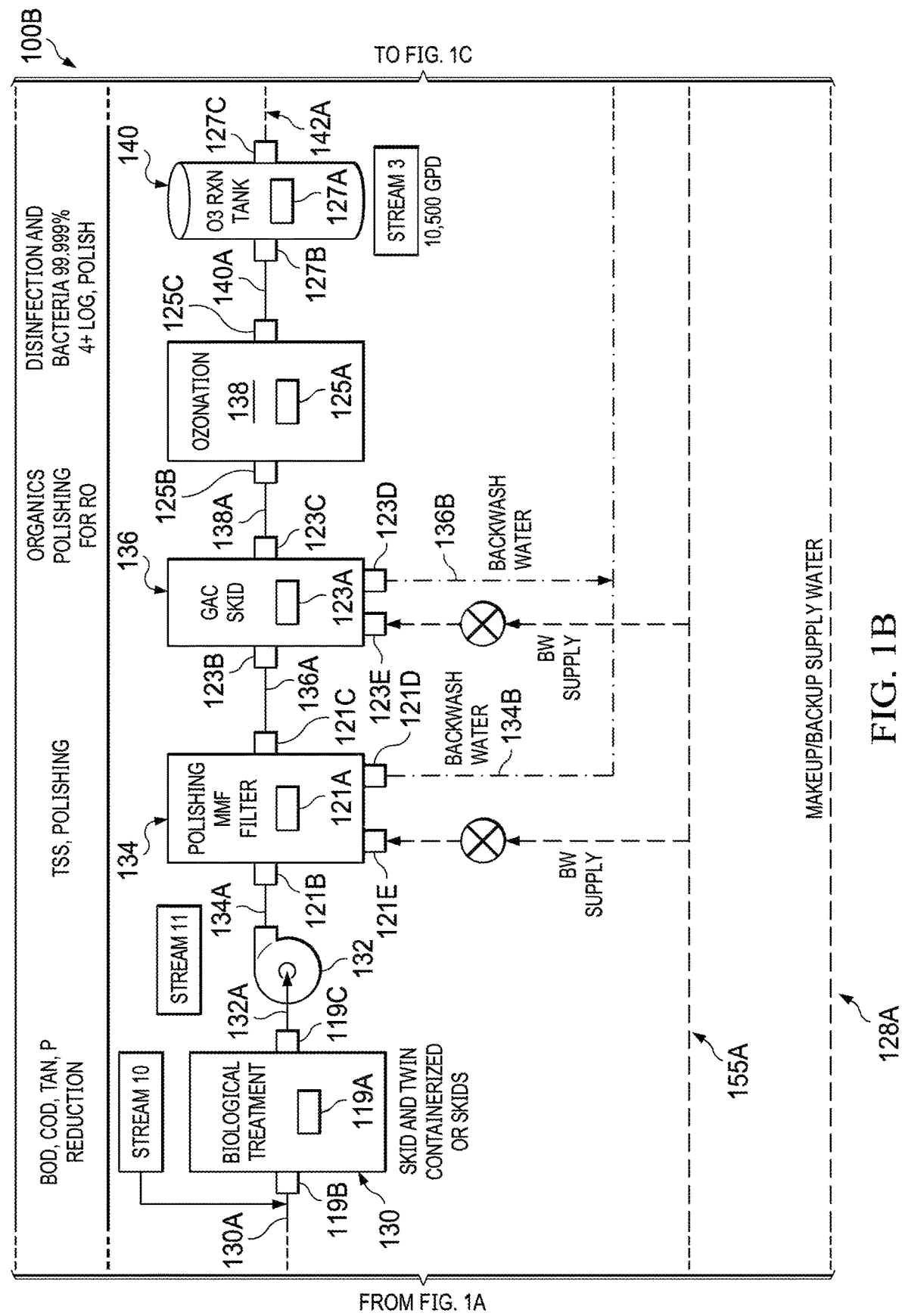
FIG. 1B is another illustration of a waste water system functionality, according to one embodiment.

In FIG. 1B, a second portion 100A of the waste water system (reference numbers 100A, 100B, 100C, and 100D) is shown, according to one embodiment. The second portion 100B of the waste water system may include a biological treatment device 130 connected to the contact tank and carbon filtration system 114 via one or more biological treatment lines 130A. In addition, the biological treatment device 130 may be connected to a second booster pump 132 via one or more second booster pump lines 132A. Further, the second booster pump 132 may be connected to the polishing mass media filter device 134 via one or more polishing mass media filter device lines 134A. In addition, the polishing mass media filter device 134 may be connected to the granular activated carbon device 136 via one or more granular activated carbon device lines 136A. Further, the granular activated carbon device 136 may be connected to the ozonation system 138 via one or more ozonation system lines 138A. In addition, the ozonation system 138 may be connected to the reaction tank 140 via one or more reaction tank lines 140A. Further, backwater streams 155A may connect to the polishing mass media filter 134 and the granular activated carbon device 136 via a second set of polishing mass media filter lines 134B and/or a second set of granular activated carbon lines 136B, respectively.

In another example, the water treatment system 100 may have a first biological treatment sensor 119A which measures the temperature, energy usage (e.g., kWh), water characteristics (any water characteristic disclosed in this document), energy demand (e.g., kW), flow rate, pressure, viscosity, efficiency, effectiveness, and/or any other data point discussed in this disclosure of the biological treatment system 130. In addition, the water treatment system 100 may have a second biological treatment sensor 119B and/or a third biological treatment sensor 119C which measures the temperature, flow rate, and water characteristics (any water characteristic disclosed in this document) of the respective fluid flows. In another example, the water treatment system 100 may have a first polishing mass media filter sensor 121A which measures the temperature, energy usage (e.g., kWh), water characteristics (any water characteristic disclosed in this document), energy demand (e.g., kW), flow rate, pressure, viscosity, efficiency, effectiveness, and/or any other data point discussed in this disclosure of the polishing mass media filter 134. In addition, the water treatment system 100 may have a second polishing mass media filter sensor 121B, a third polishing mass media filter sensor 121C, a fourth polishing mass media filter sensor 121D, and/or an Nth polishing mass media filter sensor 121E which measures the temperature, flow rate, and water characteristics (any water characteristic disclosed in this document) of the respective fluid flows. In another example, the water treatment system 100 may have a first granular activated carbon sensor 123A which measures the temperature, energy usage (e.g., kWh), water characteristics (any water characteristic disclosed in this document), energy demand (e.g., kW), flow rate, pressure, viscosity, efficiency, effectiveness, and/or any other data point discussed in this disclosure of the granular activated carbon system 136. In addition, the water treatment system 100 may have a second granular activated carbon sensor 123B, a third granular activated carbon sensor 123C, a fourth granular activated carbon sensor 123D, and/or an Nth granular activated carbon sensor 123E which measures the temperature, flow rate, and water characteristics (any water characteristic disclosed in this document) of the respective fluid flows. In another example, the water treatment system 100 may have a first ozonation sensor 125A which measures the temperature, energy usage (e.g., kWh), water characteristics (any water characteristic disclosed in this document), energy demand (e.g., kW), flow rate, pressure, viscosity, efficiency, effectiveness, and/or any other data point discussed in this disclosure of the ozonation device 138. In addition, the water treatment system 100 may have a second ozonation sensor 125B and/or a third first ozonation sensor 125C which measures the temperature, flow rate, and water characteristics (any water characteristic disclosed in this document) of the respective fluid flows.

In another example, the water treatment system 100 may have a first reaction tank sensor 127A which measures the temperature, energy usage (e.g., kWh), water characteristics (any water characteristic disclosed in this document), energy demand (e.g., kW), flow rate, pressure, viscosity, efficiency, effectiveness, and/or any other data point discussed in this disclosure of the reaction tank 140. In addition, the water treatment system 100 may have a second reaction tank sensor 127B and/or a third reaction tank sensor 127C which measures the temperature, flow rate, and water characteristics (any water characteristic disclosed in this document) of the respective fluid flows.

Figure 1C:
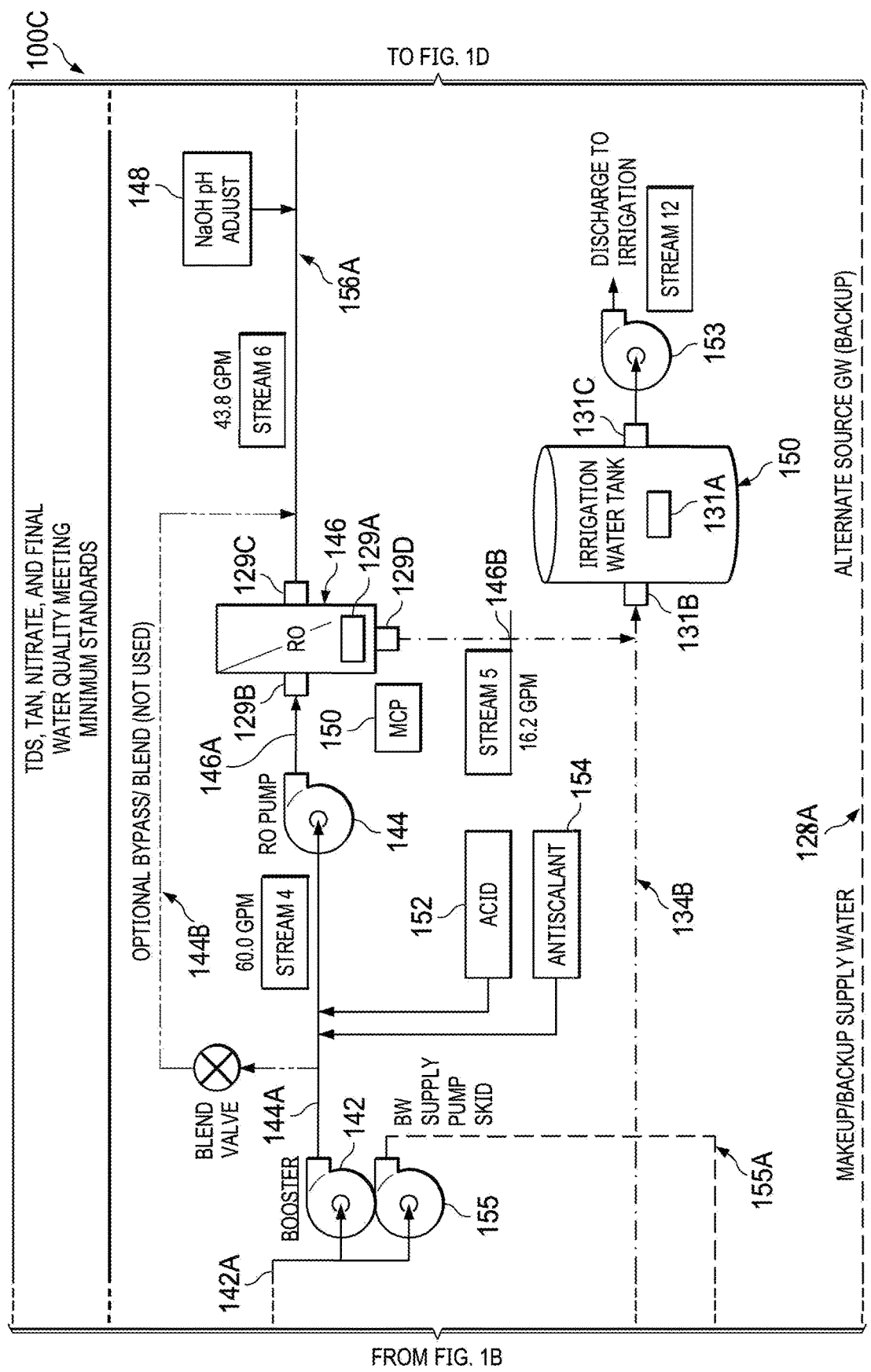
FIG. 1C is another illustration of a waste water system functionality, according to one embodiment.

In FIG. 1C, a third portion 100C of the waste water system (reference numbers 100A, 100B, 100C, and 100D) is shown, according to one embodiment. The third portion 100C of the waste water system may include a third booster pump 142 connected to the reaction tank 140 via one or more third booster pump lines 142A. In addition, the third booster pump 142 may connect with a reverse osmosis pump 144 via one or more reverse osmosis pump lines 144A. In addition, a bypass line 144B may be utilized to bypass the reverse osmosis pump 144 and/or a reverse osmosis system 146. Further, the reverse osmosis pump 144 may be connected to the reverse osmosis system 146 via one or more reverse osmosis system lines 146A. In addition, the reverse osmosis system 146 may be connected to an irrigation water tank 150 via a second set of reverse osmosis lines 146B. In addition, a motor control panel 150 may be utilized. Further, the irrigation water tank 150 may be connected to an irrigation pump 153. In addition, an acid device 152 and/or an antiscalant device 154 may be connected to the one or more reverse osmosis lines 144A. In addition, a backwater supply pump 155 may be connected to the one or more third booster pump lines 142A and/or the polishing mass media filter 134 and/or the granular activated carbon device 136. In addition a NaOH pH adjusting device 148 may be connected to one or more SOW wash water and drinking water tank lines 156A.

In another example, the water treatment system 100 may have a first reverse osmosis sensor 129A which measures the temperature, energy usage (e.g., kWh), water characteristics (any water characteristic disclosed in this document), energy demand (e.g., kW), flow rate, pressure, viscosity, efficiency, effectiveness, and/or any other data point discussed in this disclosure of the reverse osmosis system 146. In addition, the water treatment system 100 may have a second reverse osmosis sensor 129B, a third reverse osmosis sensor 129C, and/or an Nth reverse osmosis sensor 129D which measures the temperature, flow rate, and water characteristics (any water characteristic disclosed in this document) of the respective fluid flows. In another example, the water treatment system 100 may have a first irrigation water tank sensor 131A which measures the temperature, energy usage (e.g., kWh), water characteristics (any water characteristic disclosed in this document), energy demand (e.g., kW), flow rate, pressure, viscosity, efficiency, effectiveness, and/or any other data point discussed in this disclosure of the irrigation water tank 150. In addition, the water treatment system 100 may have a second irrigation water tank sensor 131B and/or a third irrigation water tank sensor 131C which measures the temperature, flow rate, and water characteristics (any water characteristic disclosed in this document) of the respective fluid flows.

In FIG. 1D, a fourth portion 100D of the waste water system (reference numbers 100A, 100B, 100C, and 100D) is shown, according to one embodiment. The fourth portion 100D of the waste water system may include a SOW wash water and drinking water tank 156 (e.g., SOW is a pig but any animal or waste source can be utilized). The SOW wash water and drinking water tank 156 may be connected to the reverse osmosis system 146 via the one or more SOW wash water and drinking water tank lines 156A. In addition, the SOW wash water and drinking water tank 156 may be connected to an ozonation low dose system 158 which treats the water from the SOW wash water and drinking water tank 156 and returns the treated water to the SOW wash water and drinking water tank 156. Further, the SOW wash water and drinking water tank 156 may be connected to a reuse/SOW water pump 160. In another example, the water treatment system 100 may have a first SOW wash water and drinking water tank sensor 105A which measures the temperature, energy usage (e.g., kWh), water characteristics (any water characteristic disclosed in this document), energy demand (e.g., kW), flow rate, pressure, viscosity, efficiency, effectiveness, and/or any other data point discussed in this disclosure of the SOW wash water and drinking water tank 156. In addition, the water treatment system 100 may have a second SOW wash water and drinking water tank sensor 133B, a third SOW wash water and drinking water tank sensor 133C, a fourth SOW wash water and drinking water tank sensor 133D, a fifth SOW wash water and drinking water tank sensor 133E and/or an Nth SOW wash water and drinking water tank sensor 133F which measures the temperature, flow rate, and water characteristics (any water characteristic disclosed in this document) of the respective fluid flows.

A first data chart 100E provides the following data. The waste water treatment system may have a product capacity of 55,000-60,000 gallons per day. There may be two 40-foot containerized packages. The polishing mass media filter may be a skid mounted automated system. The granular activated carbon may be a manual system and/or the granular activated carbon may be an automated system. The reverse osmosis system may have a utilization rate of 83% and the pretreatment equipment has a 95% utilization rate. The sludge to onsite dewatering boxes may have outputs of 10-15% solids upon drying and 5% volumetric proportion of wet sludge.

In FIG. 1E, a second data chart 100F is shown, according to one embodiment. Stream O feed water flow may be configured to provide 90 gallons per minute and/or 97,200 gallons per day based on utilization requirements.

Stream 1 pretreatment water flow may be configured to provide 60 gallons per minute and/or 82,080 gallons per day at 95% utilization.

Stream 2A toilet flush from Equalizing tank 108 may be configured to provide makeup and/or 14,500 gallons per day makeup to blend with decant.

Stream 2B toilet flush water may be configured to provide decant water and/or 9,500 gallons per day.

Stream 3 backwash supply and/or wastewater may be configured to provide up to 10,500 gallons per day. In addition, MMF#1 and MMF#2 which are two different mass media filters and are 40 foot containerized packages.

Stream 1 through Stream 3 may be configured to provide available feed to reverse osmosis system 146 of up to 71,580 gallons per day. This is the available feed to the reverse osmosis system 146.

Stream 4 feed flow to reverse osmosis system 146 may be configured to provide 60 gallons per minute and/or 71,712 gallons per day at any given utilization. In one example, it is a skid mounted membrane system following ozonation.

Steam 5 concentrate flow may be configured to provide 16.2 gallons per minute and/or 19,362 gallons per day to irrigation.

Steam 6 permeate flow may be configured to provide 43.8 gallons per minute and/or 52,350 gallons per day.

Steam 7 Sow wash water may be configured to provide total needed gallons per minute and/or 10,000 gallons per day. In one example, a 83% utilization for reverse osmosis system 146 and 95% utilization for all pretreatment equipment are utilized.

Stream 8 Drinking Water may be configured to provide total needed gallons per minute and/or 42,000 gallons per day. Sludge to onsite dewatering boxes; 10-15% solids upon drying and 5% volumetric proportion of wet sludge.

Stream 9 sludge to onsite disposal may be configured to provide intermittent gallons per minute and/or 630 gallons wet and/or 19 cuft for Cuft of D-sludge per day (d-box).

Stream 10 feed to MABR may be configured to provide 60 gallons per minute and/or 82,080 gallons per day.

Stream 11 post to MABR may be configured to provide 60 gallons per minute and/or 82,080 gallons per day.

Stream 12 irrigation water may be configured to provide 16.2 gallons per minute and back water and/or 22,362 gallons per day.

In various examples, Stream 0 has a pH level of between 7.5 to 8.5 milligrams per liter; Stream 0 has a TDS level of between 2,500 to 3,500 milligrams per liter; Stream 0 has a TOC level of between 268 to 260 milligrams per liter; Stream 0 has a TKN level of between 450 to 350 milligrams per liter; Stream 0 has an Ammonia-N (TAN) level of between 255 to 360 milligrams per liter; Stream 0 has a BOD level of between 100 to 170 milligrams per liter; Stream 0 has a COD level of between 1000-1700 milligrams per liter; Stream 0 has a TSS level of between 285-600 milligrams per liter; Stream 0 has a Temperature range of between 50 to 70 degrees Fahrenheit; Stream 0 has a Silica level of between 31 to 200 milligrams per liter; Stream 0 has a Hardness level of 160 milligrams per liter; Stream 0 has an Alkalinity level of 1,603 milligrams per liter; Stream 0 has a Sulfate level of 110 milligrams per liter; Stream 0 has a Sulfur level of 317 milligrams per liter; Stream 0 has an Iron level of less than 1 milligram per liter; Stream 0 has a Copper level of less than 1 milligram per liter; Stream 0 has a Chloride of level 170 milligrams per liter; Stream 0 has a nitrate (as No3) level of 23 (No3) milligrams per liter; Stream 0 has a Nitrite level of less than 1 milligram per liter; Stream 0 has a Barium level of between 1 to 7 milligrams per liter; Stream 0 has a Calcium level of between 35 to 52 milligrams per liter; Stream 0 has a Magnesium level of between 25 to 30 milligrams per liter; Stream 0 has a Sodium level of between 210 to 350 milligrams per liter; Stream 0 has a Conductivity level of less than 5,000 milligrams per liter; Stream 0 has a Total Phosphorous level of between 57 to 60 milligrams per liter; Stream 0 has an Ortho phosphorus level of 64 milligrams per liter; Stream 0 has a Fecal Coliform level of 1.55 E5 cfu per milliliters; Stream 0 has an *E coli* level of 7.38 E4 cfu per milliliters; Stream 10 has a pH level of between 7.8 to 8.8 milligrams per liter; Stream 10 has a TDS level of between 2,500 to 2,950 milligrams per liter; Stream 10 has a TOC level of 260 milligrams per liter; Stream 10 has a TKN level of 350 milligrams per liter; Stream 10 has an Ammonia-N (TAN) level of between 230 to 280 milligrams per liter; Stream 10 has a BOD level of between 87 to 100 milligrams per liter; Stream 10 has a COD level of 650 milligrams per liter; Stream 10 has a TSS level of between 44 to 85 milligrams per liter; Stream 10 has a Temperature of 65 degrees Fahrenheit; Stream 10 has a Silica level of between 14 to 30 milligrams per liter; Stream 10 has a Hardness level of 135 milligrams per liter; Stream 10 has an Alkalinity level of 1,473 milligrams per liter; Stream 10 has a Sulfate level of 110 milligrams per liter; Stream 10 has a Sulfur level of 40 milligrams per liter; Stream 10 has an Iron level of less than 1 milligram per liter; Stream 10 has a Copper level of less than 1 milligram per liter; Stream 10 has a Chloride level of 360 milligrams per liter; Stream 10 has a nitrate (as No3) level of 15 (NO3) milligrams per liter; Stream 10 has a Barium level of less than 0.5 milligrams per liter; Stream 10 has a Calcium level of between 35 to 52 milligrams per liter; Stream 10 has a Magnesium level of 10 milligrams per liter; Stream 10 has a Sodium level of between 180 to 250 milligrams per liter; Stream 10 has a Conductivity level of less than 4,310 milligrams per liter; Stream 10 has a Total Phosphorous level of between 24-31 milligrams per liter; Stream 10 has an Ortho phosphorus level of no change; Stream 10 has a Fecal Coliform level of no change; Stream 10 has an *E coli* level of no change; Stream 11 has a pH level of between 8.3 to 8.5 milligrams per liter; Stream 11 has a TDS level of between 2,500 to 2,950 milligrams per liter; Stream 11 has a TOC level of 206 milligrams per liter; Stream 11 has a TKN level of 190 to 200 milligrams per liter; Stream 11 has an Ammonia-N (TAN) level of between 80 to 120 milligrams per liter; Stream 11 has a BOD level of 10 milligrams per liter; Stream 11 has a COD level of 515 milligrams per liter; Stream 11 has a TSS level of between 30 milligrams per liter; Stream 11 has a Temperature of 65 degrees Fahrenheit; Stream 11 has a Silica level of between 14 to 30 milligrams per liter; Stream 11 has a Hardness level of 135 milligrams per liter; Stream 11 has an Alkalinity level of between 718 to 790 milligrams per liter; Stream 11 has a Sulfate level of 110 milligrams per liter; Stream 11 has an Iron level of less than 1 milligram per liter; Stream 11 has a Copper level of less than 1 milligram per liter; Stream 11 has a Chloride level of 360 milligrams per liter; Stream 11 has a Manganese level of less than 0.05 milligrams per liter; Stream 11 has a nitrate (as No3) level of 95 to 105 (as N) milligrams per liter; Stream 11 has a Nitrite level of less than 2 milligrams per liter; Stream 11 has a Barium level of less than 0.5 milligrams per liter; Stream 11 has a Calcium level without any change; Stream 11 has a Magnesium level without any change; Stream 11 has a Sodium level of between 180 to 250 milligrams per liter; Stream 11 has a Conductivity level without any significant change; Stream 11 has a Total Phosphorous level without any significant change; Stream 4 has a pH level of 8.3 milligrams per liter; Stream 4 has a TDS level of between 2,500 to 2,950 milligrams per liter; Stream 4 has a TOC level of less than 100 milligrams per liter; Stream 4 has a TKN level of 175 milligrams per liter; Stream 4 has an Ammonia-N (TAN) level of between 80 to 120 milligrams per liter; Stream 4 has a BOD level of less than 10 milligrams per liter; Stream 4 has a COD level of 309 milligrams per liter; Stream 4 has a TSS level of less than 1 milligram per liter; Stream 4 has a Temperature of 65 degrees Fahrenheit; Stream 4 has a Silica level of between 12 to 24 milligrams per liter; Stream 4 has a Hardness level of 135 milligrams per liter; Stream 4 has an Alkalinity level of between 718 to 790 milligrams per liter; Stream 4 has a Sulfate level of 110 milligrams per liter; Stream 4 has an Iron level of less than 0.1 milligram per liter; Stream 4 has a Copper level of less than 1 milligram per liter; Stream 4 has a Chloride level of 360 milligrams per liter; Stream 4 has a Manganese level without any data; Stream 4 has a nitrate (as No3) level of 95 to 105 (as N) milligrams per liter; Stream 4 has a Nitrite level of less than 2 milligrams per liter; Stream 4 has a Barium level of less than 0.5 milligrams per liter; Stream 4 has a Calcium level of between 35 to 52 milligrams per liter; Stream 4 has a Magnesium level of 25 milligrams per liter; Stream 4 has a Sodium level of between 180 to 250 milligrams per liter; Stream 4 has a Conductivity level of 4,310 milligrams per liter; Stream 4 has a Total Phosphorous level of 31 milligrams per liter; Stream 4 has an Ortho phosphorus level of 32 milligrams per liter; Stream 4 has a Fecal Coliform level of less than 100 cfu per milliliters; Stream 4 has an *E coli* level of less than 100 cfu per milliliters; Stream 6 has the best pH level estimate at this time of 5.5 milligrams per liter; Stream 6 has a TDS level of less than 80 milligrams per liter; Stream 6 has a TOC level of less than 10 milligrams per liter; Stream 6 has an Ammonia-N (TAN) level of 6 milligrams per liter; Stream 6 has a BOD level of less than 1 milligrams per liter; Stream 6 has a TSS level of not detectable; Stream 6 has a Temperature of 65 degrees Fahrenheit; Stream 6 has a Silica level of less than 1 milligrams per liter; Stream 6 has a Hardness level of less than 1 milligrams per liter; Stream 6 has an Alkalinity level of 10 milligrams per liter; Stream 6 has a Sulfate level of less than 1 milligrams per liter; Stream 6 has an Iron level of not detectable; Stream 6 has a Copper level of less than 1 milligram per liter; Stream 6 has a Chloride level of less than 3 milligrams per liter; Stream 6 has a Manganese level of less than 0.02 milligrams per liter; Stream 6 has a nitrate (as No3) level of 9 as N milligrams per liter; Stream 6 has a Nitrite level of less than 0.5 milligrams per liter; Stream 6 has a Barium level of 0.003 milligrams per liter; Stream 6 has a Calcium level of less than 1 milligrams per liter; Stream 6 has a Magnesium level of less than 0.2 milligrams per liter; Stream 6 has a Sodium level of 5 milligrams per liter; Stream 6 has a Conductivity level of 96 milligrams per liter; Stream 6 has an Ortho phosphorus level of less than 0.2 milligrams per liter; - - - has the best pH level estimate at this time of between 6.0 to 8.5 post pH level adjusted milligrams per liter - - - has a TDS level of less than 1,000 milligrams per liter - - - has an Ammonia-N (TAN) level of less than 50 milligrams per liter target - - - has a TSS level of less than 1 milligrams per liter - - - has a Sulfate level of less than 1,000 milligrams per liter - - - has an Iron level of less than 0.3 milligrams per liter - - - has a Manganese level of less than 0.05 milligrams per liter - - - has a nitrate (as No3) level of less than 10 milligrams per liter (as N) - - - has a Nitrite level of less than 2 milligrams per liter - - - has a Total Phosphorous level of no limit - - - has a Fecal Coliform level of 99.99% or greater than before reverse osmosis system - - - has an *E coli* level of 99.99% or greater than before reverse osmosis system; Stream 12 has a pH level of 8.4 milligrams per liter; Stream 12 has a TDS level of 10,486 milligrams per liter; Stream 12 has a TOC level of 300 milligrams per liter; Stream 12 has a TKN level of 525 milligrams per liter; Stream 12 has an Ammonia-N (TAN) level of less than 300 milligrams per liter; Stream 12 has a BOD level of less than 40 milligrams per liter; Stream 12 has a COD level of less than 1,100 milligrams per liter; Stream 12 has a TSS level of less than 10 milligrams per liter; Stream 12 has a Temperature of 65 degrees Fahrenheit; Stream 12 has a Silica level of 89 milligrams per liter; Stream 12 has an Alkalinity level of 2,330 milligrams per liter; Stream 12 has a Sulfate level of 810 milligrams per liter; Stream 12 has an Iron level of less than 1 milligrams per liter; Stream 12 has a Chloride level of 1,300 milligrams per liter; Stream 12 has a nitrate (as No3) level of 508 milligrams per liter; Stream 12 has a Barium level of 1 milligrams per liter; Stream 12 has a Calcium level of 191 milligrams per liter; Stream 12 has a Magnesium level of 92 milligrams per liter; Stream 12 has a Sodium level of 915 milligrams per liter; Stream 12 has a Conductivity level of 11,115 milligrams per liter; Stream 12 has an Ortho phosphorus level of 118 milligrams per liter; Stream 9 has a pH level of 8.4 milligrams per liter; Stream 9 has a TDS level of 3,000 milligrams per liter; Stream 9 has a TOC level of 128 milligrams per liter; Stream 9 has a TKN level of 1600 milligrams per liter; Stream 9 has an Ammonia-N (TAN) level of 400 milligrams per liter; Stream 9 has a BOD level of between 87 to 170 milligrams per liter; Stream 9 has a COD level of 16,000 milligrams per liter; Stream 9 has a TSS level of 3,901 milligram per liter; Stream 9 has a Temperature without any change; Stream 9 has a Silica level of between 30 to 100 milligrams per liter; Stream 9 has a Hardness level of 320 milligrams per liter; Stream 9 has an Alkalinity level of 2,080 milligrams per liter; Stream 9 has a Sulfate level of 110 milligrams per liter; Stream 9 has a Sulfur level of 4432 milligrams per liter; Stream 9 has an Iron level of 8 milligram per liter; Stream 9 has a Copper level of 1 milligram per liter; Stream 9 has a Chloride level of 360 milligrams per liter; Stream 9 has a Manganese level of less than 1 milligram per liter; Stream 9 has a nitrate (as No3) level of 80 (as NO3) milligrams per liter; Stream 9 has a Nitrite level of an unknown amount; Stream 9 has a Barium level of less than 1 milligram per liter; Stream 9 has a Calcium level of 112 milligrams per liter; Stream 9 has a Magnesium level of 320 milligrams per liter; Stream 9 has a Sodium level of 480 milligrams per liter; Stream 9 has a Conductivity level of between 4 to 5,000 milligrams per liter; Stream 9 has a Total Phosphorous level of 528 milligrams per liter; Stream 9 has an Ortho phosphorus level of 64 milligrams per liter; Stream 9 has a Fecal Coliform level of TNTC; Stream 9 has an *E coli* level of TNTC; and/or Stream 9 has a volume per day of 630 gallons per day. It should be noted that a range of plus or minus 10% can be utilized with any number disclosed in this document. Therefore, any data point within this plus or minus 10% range is expressly included in this disclosure. For example, Stream 9 has an Ortho phosphorus level of 64 milligrams per liter. Therefore, a range of 57.6 milligrams per liter to 70.4 milligrams per liter of Ortho phosphorus level is included in this disclosure and every data point between 57.6 milligrams per liter to 70.4 milligrams per liter is expressly included in this disclosure and is only not written out for the purpose of brevity.

Figure 2:
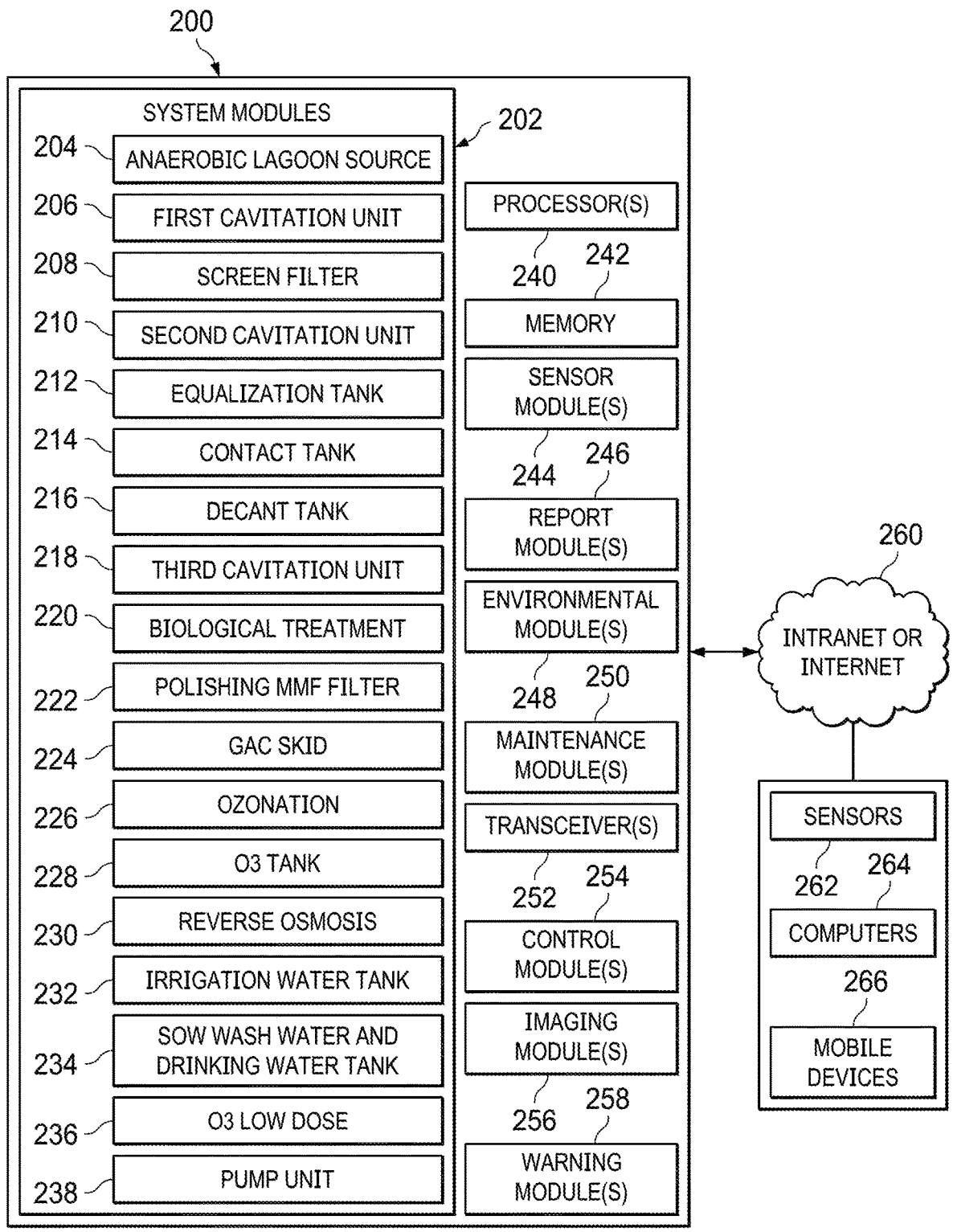
FIG. 2 is a block diagram of a waste water system, according to one embodiment.

FIG. 2 is a block diagram of a waste water system, according to one embodiment. In this example, a control system 200 includes various modules 202 which are: an anaerobic lagoon source module 204; a first cavitation unit module 206; a screen filter module 208; a second cavitation unit module 210; an equalization tank module 212; a contact tank module 214; a decant tank module 216; a third cavitation unit module 218; a biological treatment module 220; a polishing mass media filter module 222 (or a polishing multi-media filter module); a granular activated carbon module 224; an ozonation module 226; an O3 tank module 228; a reverse osmosis module 230; an irrigation water tank module 232; a SOW wash water and drinking water tank module 234; an ozonation low dose tank module 236; and/or a pump unit module 238. In addition, control system 200 may include one or more processors 240, one or more memory units 242, one or more sensor modules 244, one or more report modules 246, one or more environmental modules 248, one or more maintenance modules 250, one or more transceivers 252, one or more control modules 254, one or more imaging modules 256, and/or one or more warning modules 258. Further, control system 200 may communicate via the Internet or Intranet 260 to one or more sensors 262, one or more computers 264, and/or one or more mobile devices 266.

Figure 3:
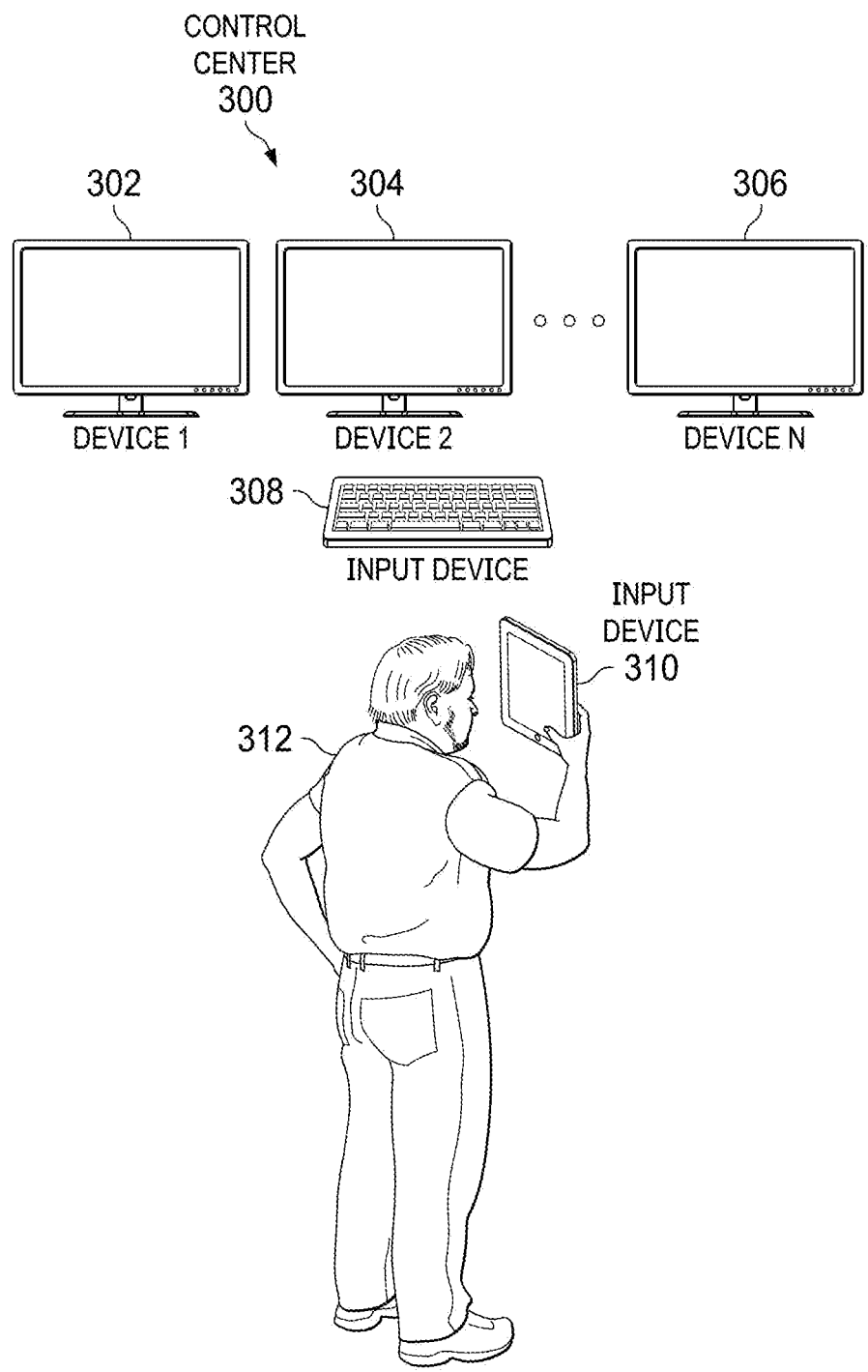
FIG. 3 is an illustration of a control center for the waste water system, according to one embodiment.

In FIG. 3, an illustration of a control center 300 for the waste water system is shown, according to one embodiment. The control center 300 may include a first monitoring device 302, a second monitoring device 304, and/or an Nth monitoring device 306. The control center 300 may include a first input device 308 and an Nth input device 310 which operator 312 can utilize to control the waste water treatment system 100. In addition, control center 300 can automatically control waste water treatment system 100 based on input from one or more devices, one or more sensors, one or more imaging devices, one or more water parameters, one or more environmental parameters, a time of day, a temperature data, a time of year, a day of the week, a weather reading, a number of animals present, flow rate data, and/or any other data in this disclosure and/or any combination thereof. Any and all data in this disclosure can be combined in any amount and/or any order to control the waste water treatment system 100 and are not listed out for brevity reasons only.

Figure 4:
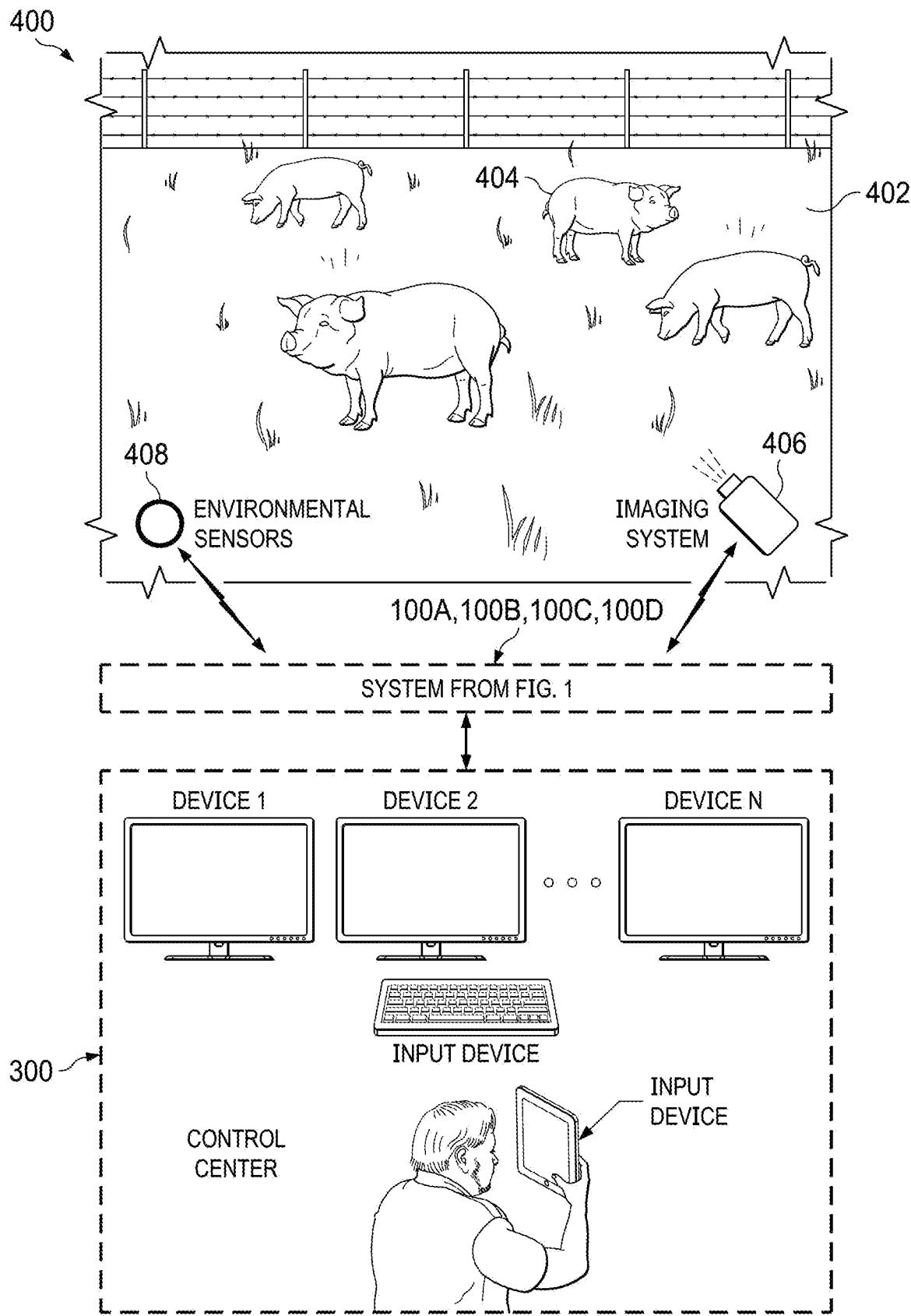
FIG. 4 is an illustration of an environmental area, the waste water system, and waste water system control center, according to one embodiment.

In FIG. 4, an illustration of an environmental area of the waste water system, and waste water system control center are shown, according to one embodiment. In one example, an environmental area 400 may include one or more waste sources 404 (e.g., pigs, cows, chemicals, etc.) on a piece of land 402, one or more imaging systems 406, and/or one or more environmental sensors 408. In one example, the one or more imaging systems 406 may provide data relating to the animals (e.g., one or more waste sources 404) to the control system 300, such as, the number of animals, the size of the animals, the geographic location of the animals, the geographic density of the animals, soil data, weather data, etc. In another example, the one or more environmental sensors 408 may provide data relating to soil conditions, air temperature, soil temperature, water temperature, soil data, water data, air data, and/or any other data in this disclosure and/or any combination thereof to the control system 300. The control system 300 may utilize one or more of these data points to control the waste water treatment system 100 and/or any component thereof. In addition, any and/or all of these data points from the one or more imaging systems 406 and/or one or more environmental sensors 408 may be combined with one or more data points from any of the equipment in the waste water treatment system 100 and utilized by the control system 300 to control the waste water treatment system 100 and/or any component thereof. In one example, weather data is determined via the one or more imaging systems 406 and/or the one or more environmental sensors 408 which determines that that the weather is a bright and sunny day. Based on this information, the control system 300 may adjust the water treatment system 100 because of the increase load caused by sunlight and/or temperature. In another example, the number of pigs can be determined from the one or more imaging systems 406 and/or the one or more environmental sensors 408 which can allow the control center 300 to adjust the water treatment system 100 based on increased load (e.g., addition pigs) or decreased load (e.g., less pigs). Further, the control center 300 may adjust the water treatment system 100 based on soil data, air temperature data, water data, and/or any other data obtained from the one or more imaging systems 406 and/or the one or more environmental sensors 408.

Figure 5:
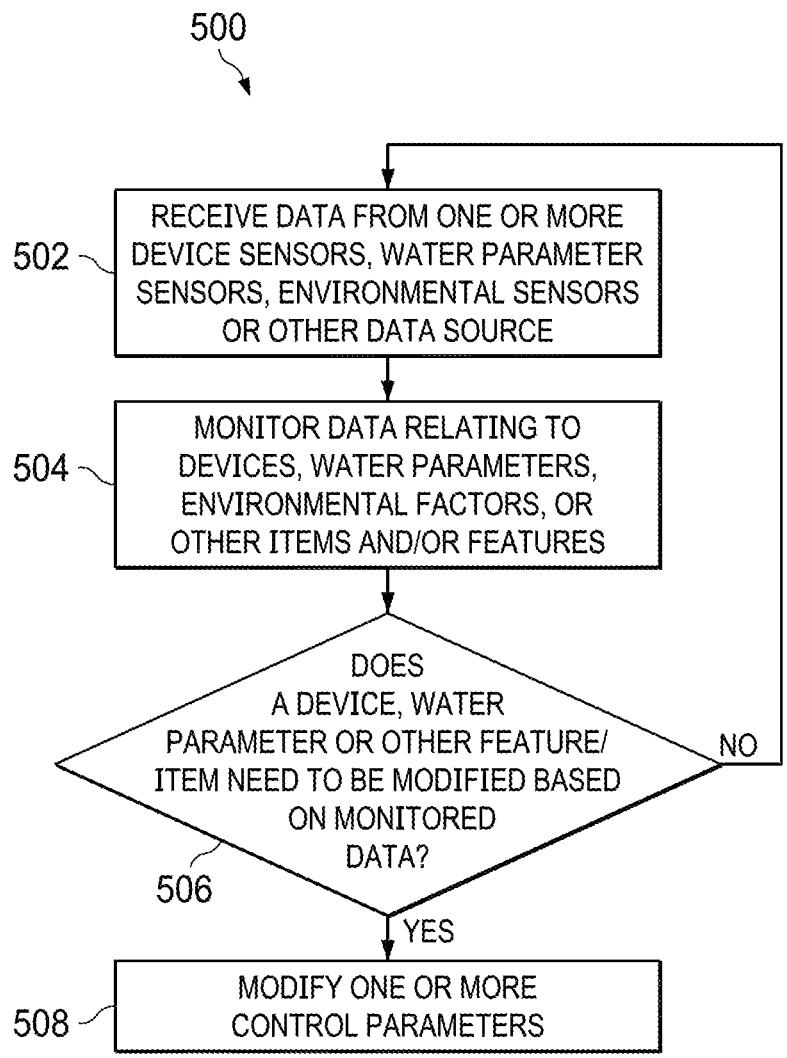
FIG. 5 is an illustration of a flow diagram, according to one embodiment.

FIG. 5 is an illustration of a flow diagram, according to one embodiment. A method 500 may include one or more processors receiving data from one or more device sensors (any combination of the equipment in FIGS. 1A-1D), one or more water parameter sensors, one or more environmental sensors, and/or any other data source described in this disclosure (step 502). The method 500 may include monitor the data by the control center 300 relating to one or more devices (any combination of the equipment in FIGS. 1A-1D), one or more water parameters, one or more environmental factors, and/or any other items and/or feature in this disclosure (step 504). The method 500 may include one or more processors determining whether a device, a water parameter, and/or any other item or feature need to be modified based on the monitored data (step 506). If the one or more processors determines that the answer is no, then the method 500 returns to step 502. If the one or more processors determine that the answer is yes, then the method 500 includes modifying one or more control parameters for the one or more devices and/or any other item and/or feature (step 508). In another example, based on weather data and/or number of pigs' data, and/or any other data, the control center 300 may increase a utilization rate for the reverse osmosis system based on anticipated demand increases. In another example, one or more sensors may determine that liquid characteristic(s) and/or water characteristic(s) in a pipe/line/container require and/or for optimization purposes that a parameter of one or more devices and/or system in the water treatment system 100 be modified. For example, a BOD level may have increased from point 1 to point 2 in the stream, therefore, based on this BOD level increasing one or more machines, devices, and/or systems may increase their output and/or run rate in anticipation of this increase in load.

Figure 6:
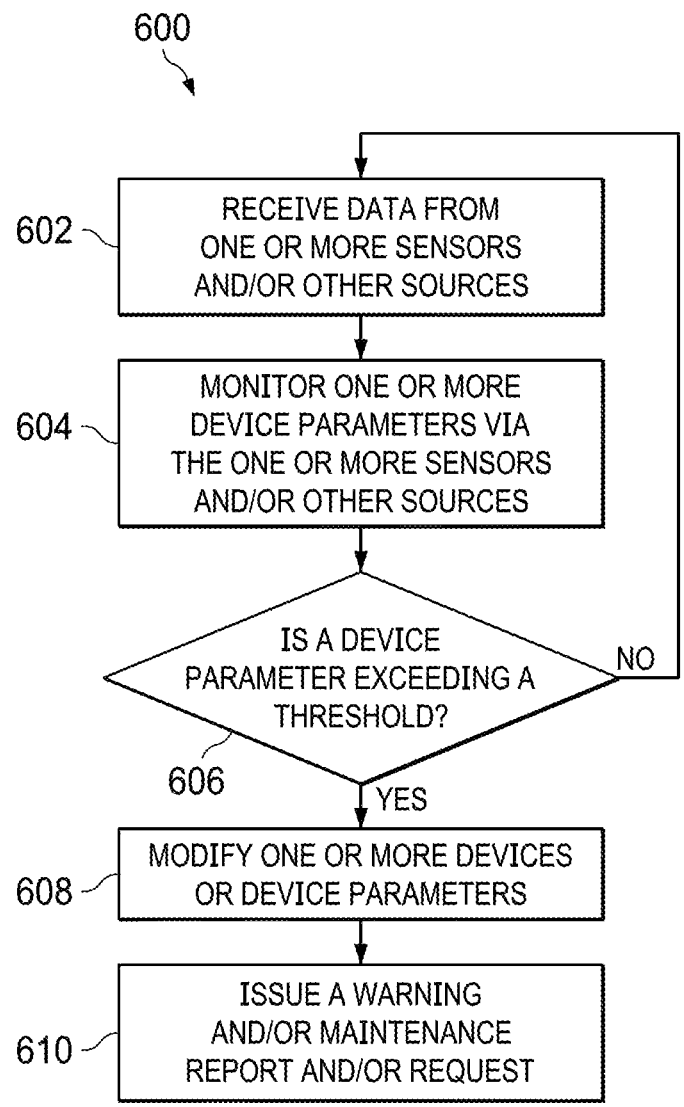
FIG. 6 is another illustration of a flow diagram, according to one embodiment.

In FIG. 6, another illustration of a flow diagram is shown, according to one embodiment. A method 600 may include one or more processors receiving data from one or more sensors and/or other data sources (step 602). The method 600 may include monitoring by the control system 300 one or more device parameters via the data received from the one or more sensors and/or other data sources (step 604). The method 600 may include the one or more processors determining whether a device parameter exceeds a threshold value (step 606). If the device parameter does not exceed a threshold value, then the method 600 moves back to step 602. If the device parameter does exceed a threshold value, then the method 600 may modify one or more devices and/or device parameters (step 608). The method 600 may include issuing one or more warnings and/or maintenance reports and/or maintenance requests (step 610). In one example, a sensor reading from the reverse osmosis system may indicate that the reverse osmosis system is at or near capacity. Based on this information, the control center 300 may slow down the flow to the reverse osmosis system (and/or open up a bypass line) by modifying one or more devices (e.g., ozonation, equalizing tank, etc.) ahead of the reverse osmosis system.

In one example, an Integrated Multi-Contaminant Reduction Treatment System may have an overall daily water delivery requirement SOW Drinking/Potable Water of: 42,000 GPD SOW Wash Water; 10,000 GPD Toilet Flush Water; and 24,000 GPD. In another example, an automated backwashing Pre-Filtration Module for Suspended Solids Reduction includes and/or is characterized by: 1 Amiad Multi-module particle filtration system; 9×2" Spin Klin screen filter for reduction of TSS; System rated for up to 90 gpm; Parallel operation with multi-Pod configuration Opal filter Pods 2" polypropylene inlet and 4" manifolds with flanged connections Pre-packaged filtration module with inlet/outlet/backwash ports; 20 micron filtration for suspended solids removal prior to equalization tank; NEMA 4X controller and small PLC to operate the unit; Requires 13 CFM at 80 psi compressed air for utilities; Automatic backwashing based on differential pressure; Requires 20 psi feed for backwash; back water duration is 5 min; flow will be approximately 12 gpm for 4-5 min total; and/or single phase 120VAC/1P/60 Hz power supply and compressed air supply.

In one example, the equalization storage tank (T-01) includes and/or is characterized by: 1 One (1) 1,000 Gallon Vertical Flat bottom Finished Water Tank (sg 1.5); Raw Water Pump, 3 hp; Bulkhead fittings for Inlet/Outlet & interconnecting plumbing, level controls Bulkhead fittings pre-installed in the tank; 4-20 mA level sensor (PIT) for level control/automated with system In one example, the equalization tank booster pump skid (60 gpm @ 15 psi) may include and/or be characterized by: Vertical Multi-stage Centrifugal Pump(s); Pump Operation: 60 gpm @ 80 psi; Cavitation Assembly Capable of process 60 gpm flow rate; NEMA 4X Control Panel with HOA Switch and Run Light Pre-piped and mounted on a tubular Stainless Steel Skid Isolation Ball Valves on Pump Suction; and/or Check Valve and Flow Throttling Ball Valve on Pump Discharge 0-100 psi Pressure Gauge on Pump Discharge.

In another example, booster feed pump skid for polishing mass media filter and/or reverse osmosis system which are at 60 gpm at 40-45 psi may include and/or be characterized by: Vertical Multi-stage Centrifugal Pump; Pump Operation: 60 gpm @ 45 psi; Isolation Ball Valves on Pump Suction; and/or Check Valve and Flow Throttling Ball Valve on Pump Discharge 0-100 psi Pressure Gauge on Pump Discharge.

In another example, APUMMF #1 Packaged, Skid Mounted Filtration System-Total Suspended solids Reduction may include and/or be characterized by: (2) 54-inch Carbon Steel Vessels Operating in parallel, skid mounted and 100 psi Non-ASME-Code Vessels; External epoxy urethane coating Internal NSF61 Epoxy Liner; One (1) Drain Valve per Vessel; One (1) Manway for Media Loading per Vessel; Internal Inlet Sch 80 PVC Distributor and Hub and Lateral Design; and/or One (1) Combination Air/Vacuum Release Valve per Vessel In another example, Automated Process Valves and Piping may include and/or be characterized by: Lot Inlet, Treated Outlet, and Backwash Headers with Flanged Tie Points; Sch 80 PVC Harness Piping on Each Vessel; Automated Valve Harness with Five (5) Lug-Style Butterfly Control Valves with Electric Actuators; Separate source backwater supply by backwater supply pump to be integrated; Manual and/or controlled Butterfly valves for vessel isolation; and/or Manual and/or controlled Diaphragm valves for back water flow control and service flow.

In another example, PLC and Controls Detail may include and/or be characterized by: Automatic System Operation (Service, Backwash, and Rinse Modes) for APUMMF; System Control PLC Installed Inside Control Panel for Automatic Operation; 304SS NEMA 4X skid mounted MCP Control Panel to House Electrical and System Controls; and/or Red Lion 10" Color Touch Screen HMI Mounted on Control Panel.

In another example, System Instrumentation/Monitoring may include and/or be characterized by: Electromagnetic Flow Meter on Each Vessel's Inlet; Pressure Sensors on System Inlet/Outlet for System DP measurement; Pressure Gauges and Sample Ports on Each Vessel's Inlet and Outlet; Electromagnetic Totalizing Flow Meter on each effluent stream (Drinking/Wash, Toilet Flush, Irrigation); and/or Electromagnetic Totalizing Flow Meter Well Water Make-Up Influent.

In another example, APU-MMF Filtration Media and Underbedding may include and/or be characterized by: 48 cubic feet of Filtration Media per vessel; Gravel, Sand and Anthracite Media for MMF; and/or design Gravel underbedding.

In another example, MMF Contact/Reaction Chamber for Coagulation/Filtration (MMF #1) may include and/or be characterized by: Single Carbon Steel, epoxy lined 100 psi rated contact tank; 42-inch diameter×60-inch side shell on epoxy coated CS frame; ASME non-code vessel with internal epoxy coating and urethane exterior coating; Inlet/outlet manual (and/or controlled) butterfly valves; One (1) Drain Valve per Vessel One (1) Manway for vessel access; Internal Inlet Sch 80 PVC Distributor and Hub and Lateral Design; and/or One (1) Combination Air/Vacuum Release Valve per Vessel.

In another example, Backwash Settling/Decant Tank for MMF #1 Filters (T-02) may include and/or be characterized by: One (1) 5,500 or 6,000 gallon or equivalent cone bottom tank; One (1) Stand/support for tank; 10 or 15 degree cone with inlet, outlet, vent; (1) 4-20 mA level sensor (PIT) for continuous tank reading; (1) float switch; and/or (1) Sludge valve, automated for open/close.

In another example, Sludge Pump Skid for Decant Tank pump out of T-02 may include or be characterized by: One (1) sludge transfer pump rated for 20 gpm @ 80 psi to divert sludge to dewatering box via cavitation assembly; Cavitation Assembly Capable of process 20 gpm flow rate; Flowserve or equivalent centrifugal pump with motor starter, gauge, piping; Tubular steel frame with HOA panel, and controls for on/off, timing; Control of pump to be Integrated with MMF Filter #1; HOA panel with on/off; and/or control wiring back to motor control panel.

In another example, Polymer Makeup Unit for Sludge Dewatering Process may include and/or be characterized by: Excel Polymer Makeup/Feed System for Sludge Dewatering; Peristaltic polymer feed pump with interlocks to sludge pump; Stainless Steel Frame, Dimensions (20"×16"×24"); Motor-less mixer; Externally mounted polymer injection valve; Mixing chamber for low dosing; Inline Mixer for sludge/diluted polymer mix; and/or Panel enclosure for on/off controls and dry contact for starting/stopping polymer/water.

In another example, Sludge Dewatering Boxes may include and/or be characterized by: 15 cubic yard Gravity Dewatering boxes for Sludge Management from CF system; One duty and one standby for dewatering applications; Model GERO-15-2-P-T or equivalent; Approximate dimensions: 23'L×8'6"W×6'9"H (with tarp); Roll off type dewatering box—Model uses disposable filters; ¼" floor and ³⁄₁₆" side walls; ¼"×2"×6" bottom rails; Gasketed side hinged rear door with 6 point chain binder closure; 8"×10" wheels (4); Includes a side to side rolling vinyl coated nylon tarp with tarp bows and tarp rolling hardware; Dewatering basket made of perforated plate floor and expanded metal sides; Basket is made into panels that are removable for cleaning; the basket will have a center divider wall running down the length of the container that effectively; Includes (4) 3" drainage ports on the bottom sides at opposing ends with camlock type fittings and caps; Includes a 3" inlet manifold that evenly distributes the incoming flow into both container compartments; Lot Coatings; Exterior coating: Blast to sp-10, prime with Carboguard 890-6 mils and top Liner for each Dewatering Box; and may be Replaced each time box is emptied.

In another example, Coagulant and Flocculant Feed Modules for mass media filter number 1 includes and/or is characterized by: (2) Stenner Peristaltic chemical metering pumps; Chemical Totes (exchangeable) shall be used in lieu of day tanks; (1) dual port shared wafer style inline mixer; (2) injection quills with check valve; (2) flowline ultrasonic level sensor for chem tank; and/or (2) Control cables and/or fittings for PLC Control.

In another example, Membrane Aerated Biofilm Reactors (MABR) may include and/or be characterized by Aspiral L5 biological Reactors for 150 m3/day with high ammonia, BOD, COD; (2) 40-foot special design containers; 5 MABR Modules per container, pre-installed and piped Internal piping, fittings, and auto valves; All blowers, pumps, and valves will be external to the containers; (2) process air blowers each at 38 SCFM @ 0.72 psi; (1) Mixing air blower at 262 SCFM @ 42 psi; (2) pressure indicators; (1) Temperature Indicator; (1) Float Switch; and/or (1) pH Meter.

In another example, Membrane Aerated Biofilm Reactor (MABR) Chemical Feed—Alkalinity Module may include and/or be characterized by: Stenner Peristaltic chemical metering pump; (1) 50 gallon Polyethylene chemical feed tank, fittings; and/or (1) injection quill with check valve Control cable, fittings for PLC Control.

In another example, the polishing Post MABR APUMMF #2 packaged, skid mounted TSS Filtration system may include and/or be characterized by: (2) 36-inch Carbon Steel Vessels Operating in parallel, skid mounted and pre-packaged; 100 psi Non-ASME-Code Vessels; External epoxy urethane coating; Internal NSF61 Epoxy Liner; One (1) Drain Valve per Vessel; One (1) Manway for Media Loading per Vessel; Internal Inlet Sch 80 PVC Distributor and Hub and Lateral Design; and/or One (1) Combination Air/Vacuum Release Valve per Vessel.

In another example, the automated process valves and piping may include and/or be characterized by: Inlet, Treated Outlet, and Backwash Headers with Flanged Tie Points; Sch 80 PVC Harness Piping on Each Vessel; Automated Valve Harness with Five (5) Lug-Style Butterfly Control Valves with Electric Actuators; Separate source back water supply by back water supply pump to be integrated; Manual (and/or controlled) back water flow control valve and manual (and/or controlled) service flow valve; and/or Manual (and/or controlled) Butterfly valves for vessel isolation.

In another example, the PLC and Controls detail may include and/or be characterized by: Automatic System Operation (Service, Backwash, and Rinse Modes) for APUMMF; System Control PLC Installed Inside Control Panel for Automatic Operation; 304SS NEMA 4X skid mounted MCP Control Panel to House Electrical and System Controls; Red Lion 10" Color Touch Screen HMI Mounted on Control Panel; and/or Common/Shared Ewon Remote Monitoring Device within reverse osmosis system panel for remote data transmission.

In another example, the System Instrumentation/Monitoring may include and/or be characterized by: Electromagnetic Flow Meter on Each Vessel's Inlet; Pressure Sensors on System Inlet/Outlet for System DP measurement; Pressure Gauges and Sample Ports on Each Vessel's Inlet and Outlet; and/or 304SS Hydraulic Panel with Pressure Gauges and Sample Ports.

In another example, the APU-MFF #2 Filtration Media and Underbedding may include and/or be characterized by: 22 cubic feet of Filtration Media per vessel; Gravel, Sand and Anthracite Media for MMF design; and/or Gravel underbedding.

In another example, the APU-GAC Packaged, Skid Mounted Filtration System—Ozone, COD Polishing system may include and/or be characterized by: (1) 60-inch Carbon Steel Vessel Operating in parallel—100% manual (and/or controlled) operation; Skid mounted on CS epoxy painted frame; 100 psi Non-ASME-Code Vessel; External epoxy urethane coating; Internal NSF61 Epoxy Liner; One (1) Drain Valve per Vessel; One (1) Manway for Media Loading per Vessel; Internal Inlet Sch 80 PVC Distributor and Hub and Lateral Design; and/or One (1) Combination Air/Vacuum Release Valve per Vessel.

In another example, the manual and/or controlled process valves and piping may include and/or be characterized by: Inlet, Treated Outlet, and Backwash Headers with Flanged Tie Points; Sch 80 PVC Harness Piping on Each Vessel; Manual (or controlled) Valve Harness with Five (5) Manual (and/or controlled) Lug-Style Butterfly Control Valves; Auxiliary Backwash Supply inlet, Manual and/or controlled Valve; Manual and/or controlled Flow Control Valve on Common Treated Water and Common Backwash Water Outlets; and/or Butterfly valves for vessel isolation.

In another example, the system instrumentation and/or monitoring may include and/or be characterized by: Inline mag Flow Meter on Vessel Inlet; Pressure Sensors on System Inlet/Outlet for System DP measurement; Pressure Gauges and Sample Ports on Each Vessel's Inlet and Outlet; and/or 304SS Hydraulic Panel with Pressure Gauges and Sample Ports.

In another example, the granular activated carbon (GAC) Adsorption media and underbedding may include and/or be characterized by: 60 cubic feet of Granular Activated Carbon Adsorption Media per vessel; 12×40 mesh bituminous carbon; and/or Gravel Underbedding.

In another example, the Backwash Supply Pump (common to MMF and GAC treatment skids) may include and/or be characterized by: Vertical Multi-stage Centrifugal Pump; Pump Operation: 200 gpm @ 35 psi; NEMA 4X Control Panel with HOA Switch and Run Light; Pre-piped and mounted on a tubular Stainless Steel Skid; Isolation Ball Valves on Pump Suction; Check Valve and Flow Throttling Ball Valve on Pump Discharge; and/or 0-100 psi Pressure Gauge on Pump Discharge.

In another example, the Pre-reverse osmosis and/or Ozonation Injection Skid may include and/or be characterized by: 1100 Gallon Vertical HDLPE Tank, Qty. 2; Ozone Injection Pump Operation: 120 GPM @ 120 psi; Hydrodynamic Cavitation Assembly: Cavitation Assembly+90 GPM Pump; Mazzie 1584 Venturi Injector, Qty. 2; and/or Schedule 80 PVC Plumbings & Fittings.

In another example, the Manual or Controlled Process Valves and Piping may include and/or be characterized by: Recirculation Isolation Valves, Qty. 2; Hydrodynamic Cavitation Loop Isolation Valves, Qty. 2; and/or Inlet/Outlet Isolation Valves, Qty. 2.

In another example, the System Instrumentation/Monitoring may include and/or be characterized by: Mass Flow Controller (0-100 slpm); Venturi Inlet/Outlet PIT (Pressure Indicating Transmitters), Qty. 2; Redundant Level Sensing Pressure Indicating Transmitters), Qty. 2 and/or ORP Analyzer, Qty. 1.

In another example, the skid mounted high-recovery flow reversal reverse osmosis unit has two-stage arrays and a feed flow of 60 gallons per minute.

In another example, the membrane elements and housings may include and/or be characterized by: reverse osmosis (RO) Membranes; size—8"×40"; 3 Composite RO housings—300 psi FRP w/stainless ports; 15 RO membranes—thin film, 400 ft2 each, High Performance, NSF; and/or 2:1 Array Staging with anticipated 73% recovery.

In another example, the process valves and piping may include and/or be characterized by: System piping—316L and Sch 80 PVC based on pressure ratings; Automated Electric actuated valves; Combination of Stainless steel and Sch 80 PVC piping based on pressures; Wafer Check Valves; and/or Labcock SS Sample Valves.

In another example, the instrumentations may include and/or be characterized by: GF Signet Flow Meters; Pressure gauges and Pressure Transmitters—prefilter, and interstage; Pump discharge, membrane feed, waste; Pressure switch—feed; Pressure relief—product and high points; Conductivity—feed, permeate; Temperature—Feed; Tank level—percent full, gallons remaining, high alarm; Low pressure/feed pump protection; and/or Remote alarm contact.

In another example, the high pressure feed pumps and cartridge filtration may include and/or be characterized by: Skid-mounted high pressure feed pump with integrated controls and variable frequency drive (VFD) to be attached onto the pump motor.

In another example, the interstage booster pump may include and/or be characterized by: One second-stage feed pump mounted on reverse osmosis skid and Pump Local Control Panel Integrated with Main System PLC.

In another example, the PLC and Controls details may include and/or be characterized by: Automatic System Operation; System Control PLC Panel for Automatic Operation Mounted on Skid Red Lion 10" Color Touch Screen HMI Mounted on Control Panel; Operator "Touch" Graphics Screens for Automatic and Manual Operation; 304SS NEMA 4X Skid-mounted Control Panel to House Electrical and System Controls; Reverse Osmosis panel integrates high pressure feed pump and standard reverse Osmosis components; Terminal Locations on Control Panel for Ancillary Controls and Device Inputs/Outputs; and/or Inputs/outputs for chemical feed flow pacing.

In another example, the standard corrosion resistant features may include and/or be characterized by: Skid Construction: Stainless Steel & Powder Coated Aluminum Structures; NEMA 4X Panels on all skids in the process train—All others NEMA 12 (MOCP & Ozone Generator Enclosure); Sch80 inlet piping (prior to booster pump); Automatic inlet valve; Stainless cartridge pre-filter housing; Stainless Multi-stage pump w/TEFC motor; Stainless high pressure piping; and/or Stainless control valve, waste control valve, victaulic clamps.

In another example, the antiscalant feed module and miscellaneous reverse osmosis feed may include and/or be characterized by: Stenner Peristaltic chemical metering pump; (1) 50 gallon Polyethylene chemical feed tank, fittings; (1) injection quill with check valve; (1) flowline ultrasonic level sensor for chem tank; Control cable, and/or fittings for PLC Control.

In another example, the acid feed module and miscellaneous reverse osmosis feed may include and/or be characterized by: Stenner Peristaltic chemical metering pump; (1) 50 gallon Polyethylene chemical feed tank, fittings; (1) injection quill with check valve; (1) flowline ultrasonic level sensor for chem tank; and/or Control cable, fittings for PLC Control.

In another example, the clean in place skid may include and/or be characterized by: AD-PTL cleaning skid, with quick connects, 30-foot length hose (clean and permeate return); Immersion heater 5 micron Filter; 316 SS pump w/ pressure gauges; TEFC motor, 120V/240V/1Ph power; 100 gpm @ 50 psi; Tank and cleaning header; and/or Unit is on casters for mobility.

In another example, the finished water (permeate) storage tank and back wash supply tank may include and/or be characterized by: One (1) 10,000 Gallon Vertical Flat bottom Finished Water; Ozone Recirculation System w/ORP; Bulkhead fittings for Inlet/Outlet & interconnecting plumbing, level controls; Bulkhead fittings pre-installed in the tank; and/or (1) 4-20 mA level sensor (PIT) for level control/automated with system.

In another example, the Master Operator Control Panel (MOCP) may include and/or be characterized by: System Control PLC; NEMA 12 Electrical Enclosure; 15" Red Lion Graphite Series User Interface; Remote Connection Capability; Variable Frequency Drives+Motor Starters (All mounted within MOCP); and/or MOCP Communicates will all system PLC and acts as the main control point or SCADA for the system.

In another example, the Toilet Flush Tank w/Ozonation may include and/or be characterized by: 1100 Gallon Vertical HDLPE Tank, Qty. 2; Ozone Injection Pump Operation: 120 GPM @ 120 psi; Mazzie 1584 Venturi Injector, Qty. 2; and/or Schedule 80 PVC Plumbings & Fittings.

In another example, the controlled and/or manual Process Valves and Piping may include and/or be characterized by: Recirculation Isolation Valves, Qty. 2; Hydrodynamic Cavitation Loop Isolation Valves, Qty. 2; and/or Inlet/Outlet Isolation Valves, Qty. 2.

In another example, the System Instrumentation/Monitoring may include and/or be characterized by: Mass Flow Controller (0-100 slpm); Venturi Inlet/Outlet PIT (Pressure Indicating Transmitters), Qty. 2; and/or Redundant Level Sensing Pressure Indicating Transmitters), Qty. 2.

In another example, the system may include: (1) Automated Single Stage Multi-Pod Pre-filter for screening Suspended Solids (Automated); (2) Membrane Aerated Biofilm Reactor Modules (Containers) for biotreatment: (2) APU-MMF Filtration Systems (Automated) Equipment Duplex: (1) Cone Bottom Decant Tank and Sludge Pump Skid; (1) APU-GAC (Manual and/or automated) Equipment Single Vessel: (1) Reverse Osmosis System: (5) Chemical Feed Modules: (1) Master RO Control Panel (MCP): (1) Backwash Supply Pump Skid for MMF and GAC filters; (1) CIP Cleaning Module for reverse osmosis system: (1) 700 gram/hr. Ozone Generation System w/2 ton Water Chiller: (1) Pre-RO Ozone Injection System w/Hydrodynamic Cavitation: (1) Toilet Flush Ozonation Injection Skid: (1) System Master Operator Control Panel (MOCP); (1) Equalization Tank & Level Controls for filtered Raw Water: Booster Pump skids, programming, and controls for MABR feed and MMF/GAC/RO feed: (1) Finished Water Tank (permeate)

for Product and Backwash Supply; and/or (1) 1400 Gallon Liquid Oxygen Tank w/Vaporizer.

In one embodiment, a water treatment system may include: a first cavitation device coupled to a wastewater source via one or more cavitation device lines; a filter coupled to the first cavitation device via one or more filter lines; an equalizing tank coupled to the filter via one or more equalizing tank lines; a second cavitation device coupled to the equalizing tank via one or more second cavitation device lines where a flow from the equalizing tank which enters the second cavitation device is modified and reenters the equalizing tank; a first booster pump coupled to the equalizing tank via one or more first boost pump lines; a contact tank coupled to the first booster pump via one or more contact tank lines; a carbon filtration device coupled to the contact tank; a biological treatment system coupled to the carbon filtration device via one or more biological treatment system lines; a second booster pump coupled to the biological treatment system via one or more second booster pump lines; a polishing mass media filter coupled to the second booster pump via one or more polishing mass media filter lines; a granular activated carbon system coupled to the polishing mass media filter via one or more granular activated carbon system feeds; an ozonation system coupled to the granular activated carbon system via one or more ozonation system lines; a reaction tank coupled to the ozonation system via one or more reaction tank lines; a third booster pump coupled to the reaction tank via one or more third booster pump lines; a reverse osmosis pump coupled to the third booster pump via one or more reverse osmosis pump lines; a reverse osmosis system coupled to the reverse osmosis pump via one or more reverse osmosis system lines; and/or a SOW tank coupled to the reverse osmosis system via one or more SOW lines.

In another example, the wastewater source is an anaerobic lagoon. In another example, the filter includes a screen, a sand media, an air media, and/or a carbon media. Further, the water treatment system may include a first backwash water line from the filter to the wastewater source, a toilet water source line from the equalization tank to one or more toilet sources, a decanting tank coupled to the contact tank where the decanting tank produces decanted water and waste, a return water pump coupled to the reaction tank and/or the contact tank to deliver a first portion of a water stream from the reaction tank to the contact tank. In addition, the return water pump may be further coupled to at least one of the carbon filtration device and the granular activated carbon system to deliver at least one of a second portion of the water stream or a third portion of the water stream to at least one the carbon filtration device and the granular activated carbon system. The water treatment system may include an acid injector device and/or an antiscalant device coupled to the one or more reverse osmosis pump lines. The water treatment system may include a bypass line coupled to the one or more reverse osmosis pump lines and the one or more SOW lines. The water treatment system may include an irrigation water tank coupled to the reverse osmosis system via one or more irrigation water tank lines and/or an ozone low dose tank coupled to the SOW tank via one or more ozone low dose tank lines. Further, a first stream from the wastewater source to the filter has a first flow rate of 90 gallons per minute, a second stream from equalizing tank to the contact tank has a second flow rate of 60 gallons per minute, a third stream from the carbon filtration device to a decant tank has a third flow rate of 10,500 gallons per day, a fourth stream from the reaction tank to the reverse osmosis system has a fourth flow rate of 60 gallons per minute, a fifth stream from the reverse osmosis system to an irrigation water tank has a fifth flow rate of 16.2 gallons per minute, a sixth stream from the reverse osmosis system to the SOW tank has a sixth flow rate of 43.8 gallons per minute, a seventh stream from the SOW has a seventh flow rate of 52,000 gallons per day, an eighth stream from the carbon filtration device to the biological treatment system has an eighth flow rate 60 gallons per minute, a ninth stream from the biological treatment system to the polishing mass media filter has a ninth flow rate of 60 gallons per minute, and/or a tenth stream from the irrigation water tank has a tenth flow rate of 22,362 gallons per day.

In another example, the first stream has a first stream pH of between 7.5 to 8.5, a first stream total dissolved solids of between 2,500 to 3,500 milligrams per liter, a first stream total organic carbons of between 268 to 275 milligrams per liter, a first stream total Kjeldahl nitrogen of between 450 to 470 milligrams per liter, a first stream ammonia-N of between 255 to 360 milligrams per liter, a first stream biological oxygen demand of between 100 to 170, a first stream chemical oxygen demand of between 1000 to 1700, a first stream total suspended solids of between 285 to 600 milligrams per liter, a first stream silica value of between 31 to 200, a first stream hardness value of between 150 to 170, a first stream alkalinity value of between 1,500 to 1,700, a first stream sulfate value of between 100 to 120, a first stream sulfur value of between 300 to 330, a first stream chloride value of between 160 to 180, a first stream calcium value of between 35 to 52, a first stream sodium value of between 210 to 350, and a first stream total phosphorus of between 57 to 60.

Further, the eighth stream has an eighth stream pH of between 7.8 to 8.8, an eighth stream total dissolved solids of between 2,500 to 2,950 milligrams per liter, an eighth stream total organic carbons of between 258 to 262 milligrams per liter, an eighth stream total Kjeldahl nitrogen of between 350 to 370 milligrams per liter, an eighth stream ammonia-N of between 230 to 280 milligrams per liter, an eighth stream biological oxygen demand of between 87 to 100, an eighth stream chemical oxygen demand of between 650 to 670, an eighth stream total suspended solids of between 44 to 85 milligrams per liter, an eighth stream silica value of between 14 to 30, an eighth stream hardness value of between 135 to 140, an eighth stream alkalinity value of between 1,450 to 1,475, an eighth stream sulfate value of between 100 to 120, an eighth stream sulfur value of between 40 to 50, an eighth stream chloride value of between 350 to 370, an eighth stream calcium value of between 35 to 52, an eighth stream sodium value of between 180 to 250, and an eighth stream total phosphorus of between 24 to 31.

In addition, the ninth stream has a ninth stream pH of between 8.3 to 8.5, a ninth stream total dissolved solids of between 2,500 to 2,950 milligrams per liter, a ninth stream total organic carbons of between 200 to 210 milligrams per liter, a ninth stream total Kjeldahl nitrogen of between 190 to 200 milligrams per liter, a ninth stream ammonia-N of between 80 to 120 milligrams per liter, a ninth stream biological oxygen demand of between 10 to 15, a ninth stream chemical oxygen demand of between 510 to 520, a ninth stream total suspended solids of between 25 to 35 milligrams per liter, a ninth stream silica value of between 14 to 30, a ninth stream hardness value of between 130 to 140, a ninth stream alkalinity value of between 715 to 790, a ninth stream sulfate value of between 100 to 120, a ninth stream chloride value of between 350 to 370, a ninth stream calcium value of between 35 to 52, a ninth stream sodium value of between 180 to 250, and a ninth stream total phosphorus of between 24 to 31.

In addition, the tenth stream has a tenth stream pH of between 8.3 to 8.5, a tenth stream total dissolved solids of between 10,250 to 10,500 milligrams per liter, a tenth stream total organic carbons of between 290 to 310 milligrams per liter, a tenth stream total Kjeldahl nitrogen of between 500 to 550 milligrams per liter, a tenth stream ammonia-N of less than 300 milligrams per liter, a tenth stream biological oxygen demand of less than 40, a tenth stream chemical oxygen demand of less than 1,000, a tenth stream total suspended solids of less than 10 milligrams per liter, a tenth stream silica value of between 85 to 90, a tenth stream alkalinity value of between 2,300 to 2,350, a tenth stream sulfate value of between 800 to 810, a tenth stream chloride value of between 1,280 to 1,320, a tenth stream calcium value of between 190 to 195, and a tenth stream sodium value of between 910 to 915.

In addition, the fourth stream has a fourth stream pH of between 8.3 to 8.35, a fourth stream total dissolved solids of between 2,500 to 2,950 milligrams per liter, a fourth stream total organic carbons of less than 100 milligrams per liter, a fourth stream total Kjeldahl nitrogen of between 170 to 180 milligrams per liter, a fourth stream ammonia-N of between 80 to 120 milligrams per liter, a fourth stream biological oxygen demand of less than 10, a fourth stream chemical oxygen demand of between 300 to 310, a fourth stream total suspended solids of less than 1 milligram per liter, a fourth stream silica value of between 12 to 24, a fourth stream hardness value of between 130 to 135, a fourth stream alkalinity value of between 718 to 790, a fourth stream sulfate value of between 100 to 120, a fourth stream chloride value of between 350 to 370, a fourth stream calcium value of between 35 to 52, a fourth stream sodium value of between 180 to 250, and a fourth stream total phosphorus of between 30 to 32.

In addition, the sixth stream has a sixth stream pH of between 5.5 to 5.6, a sixth stream total dissolved solids of less than 80 milligrams per liter, a sixth stream total organic carbons of less than 10 milligrams per liter, a sixth stream ammonia-N of between 5 to 7 milligrams per liter, a sixth stream biological oxygen demand of less than 1, a sixth stream total suspended solids of less than 1 milligram per liter, a sixth stream silica value of less than 1, a sixth stream hardness value of less than 1, a sixth stream alkalinity value of between 8 to 12, a sixth stream sulfate value of less than 1, a sixth stream chloride value of less than 3, a sixth stream calcium value of less than 1, and a sixth stream sodium value of between 4 to 6.

Reverse Osmosis Parameters Chart

The Max Well Flow reverse osmosis parameter may be 90 gallons per minute. The Blended and/or Bypass reverse osmosis parameter may be from 0-60 gallons per minute. The reverse osmosis flow reverse osmosis parameter may be 60 gallons per minute. The Max Concentrate Flow reverse osmosis parameter may be 16.2 gallons per minute. The Permeate Flow reverse osmosis parameter may be 43.8 gallons per minute. The Total Product Flow reverse osmosis parameter may be 43.8 gallons per minute. The reverse osmosis Recovery reverse osmosis parameter may be 73.0 percent. The Total Recovery with Blend reverse osmosis parameter may be 73.0 percent. The Motor Requirements reverse osmosis parameter was 9 HP. The Antiscalant Dosing reverse osmosis parameter may be 2.10 milligrams per liter. The Acid Dosing reverse osmosis parameter may be 2.5 milligrams per liter. The Membrane Array of reverse osmosis may be 2:1. The number of pressure vessels of reverse osmosis may be 3. The number of Membranes total of reverse osmosis may be 15. The reverse osmosis parameters may be 2.00 kilowatts per 1,000 gallons. The Antiscalant usage of reverse osmosis parameters may be 55 gallons per year. The Acid Usage of reverse osmosis parameters may be 176 gallons per year. The CIP of reverse osmosis parameters may be 3 per year. The Max Production of permeate reverse osmosis parameters may be 63,072 gallons per day. The Utilization of reverse osmosis parameters may be 83%. The Production of reverse osmosis parameters may be 52,350 gallons per day.

Other Parameters Chart

The MABR parameters may be Aspiral. The number of containers may be 2. The number of blowers may be 3. The Design Capacity parameter may be 50,000 gallons per day. The Total MABR HP parameter may be less than 15 HP. The TSS in Effluent parameter may be 30 milligrams per liter. The Automated CF-MMF Filtering sizing parameter may be APUMMF-5460 CS-2-AVH. The MMF Media Volume per system parameter may be 96 Cuft. The Backwash Water parameter may be 4000 gallons per event. The Backwash Water parameter may be 8,000 gallons per day.

Pump Name Chart:

The Raw Water Pump may have a horsepower of 3, which may deliver 90 gallons per minute at 15 PSI. The Boost Feed Pump to MABR with cavitation may have a horsepower of 15, which may deliver 60 gallons per minute at 70 PSI. The Decant Sludge Pump with cavitation may have a horsepower of 5, which may deliver 20 gallons per minute at 70 PSI. The Polymer Pump may have a horsepower of 0.5, which may deliver 20 gallons per minute at 15 PSI. The Booster Feed Pump to MMF may have a horsepower of 4, which may deliver 60 gallons per minute at 45 PSI. The Booster Feed Pump to Reverse Osmosis Pump may have a horsepower of 4, which may deliver 60 gallons per minute at 45 PSI. The Reverse Osmosis Pump may have a horsepower of 8.3. The 03 Recirculation Pump may have a horsepower of 10, which may deliver 120 gallons per minute at 60 PSI. The Drinking and Wash Delivery Pump may have a horsepower of 4, which may deliver 60 gallons per minute at 45 PSI. The Irrigation Pump may have a horsepower of 4, which may deliver 60 gallons per minute at 45 PSI. The Backwash Supply Pump may have a horsepower of 15, which may deliver 200 gallons per minute at 35 PSI. The Toilet Flush Pump may have a horsepower of 1.5, which may deliver 60 gallons per minute at 15 PSI. The Drinking Water 03 pump may have a horsepower of 1.5, which may deliver 15 gallons per minute at 30 PSI. The Toilet Flush 03 pump may have a horsepower of 4, which may deliver 60 gallons per minute at 45 PSI. The Ozone Generator may have a horsepower of 7.42. The Chiller may have a horsepower of 4.2.

All locations, sizes, shapes, measurements, ratios, amounts, angles, component or part locations, configurations, dimensions, values, materials, orientations, etc. discussed above or shown in the drawings are merely by way of example and are not considered limiting and other locations, sizes, shapes, measurements, ratios, amounts, angles, component or part locations, configurations, dimensions, values, materials, orientations, etc. can be chosen and used and all are considered within the scope of the disclosure.

Dimensions of certain parts as shown in the drawings may have been modified and/or exaggerated for the purpose of clarity of illustration and are not considered limiting.

While the water treatment system has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methods and/or methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," "in addition", "further", and/or "another example" should be considered to mean that the particular features, structures, or characteristics may be combined in one or more examples. Any combination of any element in this disclosure with any other element in this disclosure is hereby disclosed.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. A water treatment system comprising: a first cavitation device coupled downstream to a wastewater source via one or more first cavitation device lines; a filter coupled downstream to the first cavitation device via one or more filter lines; an equalizing tank coupled downstream to the filter via one or more equalizing tank lines; a second cavitation device coupled to the equalizing tank via one or more second cavitation device lines where a flow from the equalizing tank which enters the second cavitation device is modified and reenters the equalizing tank; a first booster pump coupled downstream to the equalizing tank via one or more first booster pump lines; a contact tank coupled downstream to the first booster pump via one or more contact tank lines; a carbon filtration device coupled to the contact tank, wherein the carbon filtration device is integral with the contact tank; a biological treatment system coupled downstream to the carbon filtration device via one or more biological treatment system lines; a second booster pump coupled downstream to the biological treatment system via one or more second booster pump lines; a polishing mass media filter coupled downstream to the second booster pump via one or more polishing mass media filter lines; a granular activated carbon system coupled downstream to the polishing mass media filter via one or more granular activated carbon system feeds; an ozonation system coupled downstream to the granular activated carbon system via one or more ozonation system lines; a reaction tank coupled downstream to the ozonation system via one or more reaction tank lines; a third booster pump coupled downstream to the reaction tank via one or more third booster pump lines; a reverse osmosis pump coupled downstream to the third booster pump via one or more reverse osmosis pump lines; a reverse osmosis system coupled downstream to the one or more reverse osmosis pump lines via one or more reverse osmosis system lines; and a sow tank coupled downstream to the reverse osmosis system via one or more sow lines.

2. The water treatment system of claim 1, wherein the wastewater source is an anaerobic lagoon.

3. The water treatment system of claim 1, wherein the filter includes at least one of a screen, a sand media, an air media, and a carbon media.

4. The water treatment system of claim 1, further comprising a first backwash water line from the filter to the wastewater source.

5. The water treatment system of claim 1, further including a toilet water source line from the equalizing tank to one or more toilet sources.

6. The water treatment system of claim 1, further comprising a decanting tank coupled to the contact tank where the decanting tank produces decanted water and waste.

7. The water treatment system of claim 1, further comprising a return water pump coupled to the reaction tank and the contact tank to deliver a first portion of a water stream from the reaction tank to the contact tank.

8. The water treatment system of claim 7, wherein the return water pump is further coupled to at least one of the carbon filtration device and the granular activated carbon system to deliver at least one of a second portion of the water stream or a third portion of the water stream to at least one the carbon filtration device and the granular activated carbon system.

9. The water treatment system of claim 1, further comprising at least one of an acid injector device and an antiscalant device coupled to the one or more reverse osmosis pump lines.

10. The water treatment system of claim 1, further comprising a bypass line coupled to the one or more reverse osmosis pump lines and the one or more sow lines.

11. The water treatment system of claim 1, further comprising an irrigation water tank coupled to the reverse osmosis system via one or more irrigation water tank lines.

12. The water treatment system of claim 1, further comprising an ozone low dose tank coupled to the sow tank via one or more ozone low dose tank lines.

13. The water treatment system of claim 1, wherein a first stream defined by the one or more first cavitation device lines and the one or more filter lines from the wastewater source to the filter is configured to provide a first flow rate of 90 gallons per minute, wherein a second stream defined by the one or more first booster pump lines and the one or more contact tank lines from equalizing tank to the contact tank is configured to provide a second flow rate of 60 gallons per minute, wherein a third stream defined by a second set of contact lines from the carbon filtration device to a decant tank is configured to provide a third flow rate of 10,500 gallons per day, wherein a fourth stream defined by the one or more third booster pump lines, the one or more reverse osmosis pump lines and the one or more reverse osmosis system lines from the reaction tank to the reverse osmosis system is configured to provide a fourth flow rate of 60 gallons per minute, wherein a fifth stream defined by a second set of reverse osmosis system lines from the reverse osmosis system to an irrigation water tank is configured to provide a fifth flow rate of 16.2 gallons per minute, wherein a sixth stream defined by the one or more sow lines from the reverse osmosis system to the sow tank is configured to provide a sixth flow rate of 43.8 gallons per minute, wherein a seventh stream defined by a reuse sow water pump line from the sow tank is configured to provide a seventh flow rate of 52,000 gallons per day, wherein an eighth stream defined by the one or more biological lines from the carbon filtration device to the biological treatment system is configured to provide an eighth flow rate 60 gallons per minute, wherein a ninth stream defined by the one or more second booster pump lines and the one or more polishing mass media filter lines from the biological treatment system to the polishing mass media filter is configured to provide a ninth flow rate of 60 gallons per minute, and wherein a tenth stream defined by an irrigation pump line from the irrigation water tank is configured to provide a tenth flow rate of 22,362 gallons per day.

14. The water treatment system of claim 13, wherein the first stream has is configured to provide a first stream pH of between 7.5 to 8.5, a first stream total dissolved solids of between 2,500 to 3,500 milligrams per liter, a first stream total organic carbons of between 268 to 275 milligrams per liter, a first stream total Kjeldahl nitrogen of between 450 to 470 milligrams per liter, a first stream ammonia-N of between 255 to 360 milligrams per liter, a first stream biological oxygen demand of between 100 to 170, a first stream chemical oxygen demand of between 1000 to 1700, a first stream total suspended solids of between 285 to 600 milligrams per liter, a first stream silica value of between 31 to 200, a first stream hardness value of between 150 to 170, a first stream alkalinity value of between 1,500 to 1,700, a first stream sulfate value of between 100 to 120, a first stream sulfur value of between 300 to 330, a first stream chloride value of between 160 to 180, a first stream calcium value of between 35 to 52, a first stream sodium value of between 210 to 350, and a first stream total phosphorus of between 57 to 60.

15. The water treatment system of claim 14, wherein the eighth stream is configured to provide an eighth stream pH of between 7.8 to 8.8, an eighth stream total dissolved solids of between 2,500 to 2,950 milligrams per liter, an eighth stream total organic carbons of between 258 to 262 milligrams per liter, an eighth stream total Kjeldahl nitrogen of between 350 to 370 milligrams per liter, an eighth stream ammonia-N of between 230 to 280 milligrams per liter, an eighth stream biological oxygen demand of between 87 to 100, a chemical oxygen demand of between 650 to 670, an eighth stream total 10 suspended solids of between 44 to 85 milligrams per liter, an eighth stream silica value of between 14 to 30, an eighth stream hardness value of between 135 to 140, an eighth stream alkalinity value of between 1,450 to 1,475, an eighth stream sulfate value of between 100 to 120, an eighth stream sulfur value of between 40 to 50, an eighth stream chloride value of between 350 to 370, an eighth stream calcium value of between 35 to 52, an eighth stream sodium value of between 180 to 250, and an eighth stream total phosphorus of between 24 to 31.

16. The water treatment system of claim 15, wherein the ninth stream is configured to provide a ninth stream pH of between 8.3 to 8.5, a ninth stream total dissolved solids of between 2,500 to 2,950 milligrams per liter, a ninth stream total organic carbons of between 200 to 210 milligrams per liter, a ninth stream total Kjeldahl nitrogen of between 190 to 200 milligrams per liter, a ninth stream ammonia-N of between 80 to 120 milligrams per liter, a ninth stream biological oxygen demand of between 10 to 15, a ninth stream chemical oxygen demand of between 510 to 520, a ninth stream total suspended solids of between 25 to 35 milligrams per liter, a ninth stream silica value of between 14 to 30, a ninth stream hardness value of between 130 to 140, a ninth stream alkalinity value of between 715 to 790, a ninth stream sulfate value of between 100 to 120, a ninth stream chloride value of between 350 to 370, a ninth stream calcium value of between 35 to 52, a ninth stream sodium value of between 180 to 250, and a ninth stream total phosphorus of between 24 to 31.

17. The water treatment system of claim 16, wherein the tenth stream is configured to provide a tenth 11 stream pH of between 8.3 to 8.5, a tenth stream total dissolved solids of between 10,250 to 10,500 milligrams per liter, a tenth stream total organic carbons of between 290 to 310 milligrams per liter, a tenth stream total Kjeldahl nitrogen of between 500 to 550 milligrams per liter, a tenth stream ammonia-N of less than 300 milligrams per liter, a tenth stream biological oxygen demand of less than 40, a tenth stream chemical oxygen demand of less than 1,000, a tenth stream total suspended solids of less than 10 milligrams per liter, a tenth stream silica value of between 85 to 90, a tenth stream alkalinity value of between 2,300 to 2,350, a tenth stream sulfate value of between 800 to 810, a tenth stream chloride value of between 1,280 to 1,320, a tenth stream calcium value of between 190 to 195, and a tenth stream sodium value of between 910 to 915.

18. The water treatment system of claim 17, wherein the fourth stream is configured to provide a fourth stream pH of between 8.3 to 8.35, a fourth stream total dissolved solids of between 2,500 to 2,950 milligrams per liter, a fourth stream total organic carbons of less than 100 milligrams per liter, a fourth stream total Kjeldahl nitrogen of between 170 to 180 milligrams per liter, a fourth stream ammonia-N of between 80 to 120 milligrams per liter, a fourth stream biological oxygen demand of less than 10, a fourth stream chemical oxygen demand of between 300 to 310, a fourth stream total suspended solids of less than 1 milligram per liter, a fourth stream silica value of between 12 to 24, a fourth stream hardness value of between 130 to 135, a fourth stream alkalinity value of between 718 to 790, a fourth stream sulfate value of between 100 to 120, a fourth stream chloride value of between 350 to 370, a fourth stream calcium value of between 35 to 52, a fourth stream sodium value of between 180 to 250, and a fourth stream total phosphorus of between 30 to 32.

19. The water treatment system of claim 18, wherein the sixth stream is configured to provide a sixth stream pH of between 5.5 to 5.6, a sixth stream total dissolved solids of less than 80 milligrams per liter, a sixth stream total organic carbons of less than 10 milligrams per liter, a sixth stream ammonia-N of between 5 to 7 milligrams per liter, a sixth stream biological oxygen demand of less than 1, a sixth stream total suspended solids of less than 1 milligram per liter, a sixth stream silica value of less than 1, a sixth stream hardness value of less than 1, a sixth stream alkalinity value of between 8 to 12, a sixth stream sulfate value of less than 1, a sixth stream chloride value of less than 3, a sixth stream calcium value of less than 1, and a sixth stream sodium value of between 4 to 6.

\* \* \* \* \*